US012456409B2

(12) United States Patent
Kim

(10) Patent No.: US 12,456,409 B2
(45) Date of Patent: Oct. 28, 2025

(54) DISPLAY DEVICE, METHOD OF DRIVING THE SAME, AND ELECTRONIC DEVICE INCLUDING THE SAME

(71) Applicant: Samsung Display Co., LTD., Yongin-si (KR)

(72) Inventor: Woung Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/399,437

(22) Filed: Dec. 28, 2023

(65) Prior Publication Data

US 2024/0412676 A1 Dec. 12, 2024

(30) Foreign Application Priority Data

Jun. 8, 2023 (KR) ........................ 10-2023-0073787

(51) Int. Cl.
*G09G 3/20* (2006.01)
*G09G 3/3233* (2016.01)

(52) U.S. Cl.
CPC ......... *G09G 3/2074* (2013.01); *G09G 3/3233* (2013.01); *G09G 2300/0452* (2013.01); *G09G 2300/0819* (2013.01); *G09G 2300/0842* (2013.01); *G09G 2320/0233* (2013.01); *G09G 2320/0238* (2013.01); *G09G 2320/0673* (2013.01); *G09G 2330/028* (2013.01)

(58) Field of Classification Search
CPC ............... G09G 3/2074; G09G 3/3233; G09G 2300/0452; G09G 2300/0819; G09G 2300/0842; G09G 2320/0233; G09G 2320/0238; G09G 2320/0673; G09G 2330/028; G09G 2340/0435; G09G 2350/00
See application file for complete search history.

(56) References Cited

U.S. PATENT DOCUMENTS 8,670,079 B2 * 3/2014 Adachi .................. H04N 5/208 348/835
10,997,909 B2 5/2021 Pyo et al.
12,067,931 B2 * 8/2024 Choi ........................ G09G 5/10
2008/0284712 A1 * 11/2008 Muto .................. G09G 3/3651 345/101

(Continued)

FOREIGN PATENT DOCUMENTS

KR 1020170121378 A 11/2017
KR 102469801 B1 11/2022
KR 102537993 B1 6/2023

OTHER PUBLICATIONS

Extended European Search Report was issued in European Patent Application No. 24166591.8 on Aug. 29, 2024 (10 pages).

*Primary Examiner* — Mihir K Rayan
(74) *Attorney, Agent, or Firm* — CANTOR COLBURN LLP

(57) ABSTRACT

A display device includes a display panel including a sub-pixel, a gate driver which provides a gate signal to the sub-pixel, a data driver which provides a data voltage to the sub-pixel, a driving voltage generator which provides a gamma reference voltage including a black data voltage to the data driver, and a driving controller which determines an offset voltage of the black data voltage based on at least one selected from a driving frequency, a dimming level, and a temperature.

25 Claims, 19 Drawing Sheets

(56) References Cited

U.S. PATENT DOCUMENTS

| | | | | |
|---|---|---|---|---|
| 2013/0135272 | A1 | 5/2013 | Park | |
| 2014/0198090 | A1 * | 7/2014 | Park | G09G 3/3233 345/82 |
| 2016/0012761 | A1 * | 1/2016 | Gai | H10K 59/351 345/694 |
| 2016/0049113 | A1 * | 2/2016 | Park | G09G 3/3208 345/212 |
| 2016/0093248 | A1 * | 3/2016 | Shimizu | G09G 3/3233 345/691 |
| 2016/0189597 | A1 * | 6/2016 | Park | G09G 3/3225 345/694 |
| 2020/0312215 | A1 * | 10/2020 | You | G09G 3/2003 |
| 2021/0343247 | A1 | 11/2021 | Pyo et al. | |
| 2023/0119897 | A1 * | 4/2023 | Oh | G09G 3/3275 345/204 |

* cited by examiner

FR1<FR2

FR1<FR2

FR1<FR2

TT1>TT2

TT1>TT2

TT1>TT2

TT1>TT2

DISPLAY DEVICE, METHOD OF DRIVING THE SAME, AND ELECTRONIC DEVICE INCLUDING THE SAME

This application claims priority to Korean Patent Application No. 10-2023-0073787, filed on, Jun. 8, 2023, and all the benefits accruing therefrom under 35 U.S.C. § 119, the content of which in its entirety is herein incorporated by reference.

BACKGROUND

1. Field

The disclosure relates to a display device, a method of driving the display device, and an electronic device including the display device.

2. Description of the Related Art

In general, a display device includes a display panel, a gate driver, a data driver, and a driving controller. The display panel may include a plurality of gate lines, a plurality of data lines, and a plurality of sub-pixels electrically connected to the plurality of gate lines and the plurality of data lines. The gate driver may provide gate signals to the gate lines, the data driver may provide data voltages to the data lines, and the driving controller may control the gate driver and the data driver.

In a display device supporting (or operable in) variable frequency driving, a time (duration or period), in which a data voltage is not written, in one frame may vary according to a driving frequency.

SUMMARY

In a display device supporting variable frequency driving, as a time, in which a data voltage is not written, in one frame increases, a current amount leaked through a switching transistor of the sub-pixel may increase, and a luminance difference may be caused due to a leaked current.

An embodiment of the disclosure is to provide a display device in which a black data voltage is adjusted.

Another embodiment of the disclosure is to provide a method of driving a display device in which a black data voltage is adjusted.

Still another embodiment of the disclosure is to provide an electronic device including a display device in which a black data voltage is adjusted.

According to embodiments of the disclosure, a display device may include a display panel including a sub-pixel, a gate driver which provides a gate signal to the sub-pixel, a data driver which provides a data voltage to the sub-pixel, a driving voltage generator which provides a gamma reference voltage including a black data voltage to the data driver, and a driving controller which determines an offset voltage of the black data voltage based on at least one selected from a driving frequency, a dimming level, and a temperature.

In an embodiment, the driving controller may determine a black data set voltage based on the driving frequency, and determine the black data voltage by adding the offset voltage of the black data voltage to the black data set voltage.

In an embodiment, the black data set voltage may decrease as the driving frequency increases.

In an embodiment, the offset voltage of the black data voltage may be less at a second dimming level, which is greater than a first dimming level, than at the first dimming level with respect to a same driving frequency and a same temperature.

In an embodiment, the offset voltage of the black data voltage may be less at a second driving frequency, which is greater than a first driving frequency, than at the first driving frequency with respect to a same driving frequency and a same temperature.

In an embodiment, the offset voltage of the black data voltage may be less at a second temperature, which is less than a first temperature, than at the first temperature frequency with respect to a same dimming level and a same frequency.

In an embodiment, the sub-pixel may include a first color sub-pixel which displays a first color and a second color sub-pixel which displays a second color, and the offset voltage of the black data voltage for the first color sub-pixel may be less than the offset voltage of the black data voltage for the second color sub-pixel with respect to a same dimming level, a same driving frequency and a same temperature.

In an embodiment, the driving controller may determine an offset voltage of an anode initialization voltage for initializing a light emitting element of the sub-pixel based on the black data voltage.

In an embodiment, the offset voltage of the anode initialization voltage may increase as the offset voltage of the black data voltage increases.

In an embodiment, the driving voltage generator may include a first regulator which generates the black data voltage by receiving a grayscale expression voltage, and the driving controller may determine an offset voltage of the grayscale expression voltage based on the black data voltage.

In an embodiment, the grayscale expression voltage may be determined as a sum of the black data voltage and a headroom margin of the first regulator.

In an embodiment, the driving voltage generator may include a first regulator which generates the black data voltage by receiving a grayscale expression voltage, the driving voltage generator may provide a gate high voltage to the gate driver, and the driving controller may determine an offset voltage of the gate high voltage based on the grayscale expression voltage.

In an embodiment, the sub-pixel may include a switching transistor, and the gate high voltage may be determined as a sum of the grayscale expression voltage and a threshold voltage of the switching transistor.

In an embodiment, the display device may further include a power supply which provides a source voltage to the driving voltage generator, the driving voltage generator may provide a gate high voltage to the gate driver and include a second regulator which generates the gate high voltage by receiving the source voltage, and the driving controller may determine the source voltage based on the gate high voltage.

In an embodiment, the source voltage may be determined as a sum of the gate high voltage and a headroom margin of the second regulator.

In an embodiment, the display device may further include a power supply which provides a source voltage to the driving voltage generator, the driving voltage generator may include a third regulator which generates a gate low voltage by receiving a reference voltage, and a reference voltage generator which generates the reference voltage based on the source voltage in a first mode and generates the reference voltage based on the source voltage and a first external voltage in a second mode, and the driving controller may select one of the first mode and the second mode based on the gate low voltage.

In an embodiment, the reference voltage in the first mode is a voltage corresponding to the source voltage, the reference voltage in the second mode is a voltage corresponding to a sum of the source voltage and the first external voltage, and the driving controller may select the second mode among the first mode and the second mode when a sum of an absolute value of the gate low voltage and a headroom margin of the third regulator is greater than an absolute value of the voltage corresponding to the source voltage.

In an embodiment, the driving controller may determine a first offset voltage of the black data voltage based on the driving frequency and the 20) dimming level, calculates a first correction black data voltage by adding the first offset voltage of the black data voltage to a black data set voltage, determine a second offset voltage of the black data voltage based on the dimming level and the temperature, calculate a second correction black data voltage by adding the second offset voltage of the black data voltage to the first correction black data voltage, and determine the second correction black data voltage as the black data voltage.

In an embodiment, the driving controller may determine a first offset voltage of an anode initialization voltage for initializing a light emitting element of the sub-pixel based on the first correction black data voltage, calculate a first correction anode initialization voltage by adding the first offset voltage of the anode initialization voltage to an anode initialization set voltage, determine a second offset voltage of the anode initialization voltage based on the second correction black data voltage, calculate a second correction anode initialization voltage by adding the second offset voltage of the anode initialization voltage to the first correction anode initialization voltage, and determine the second correction anode initialization voltage as the anode initialization voltage.

In an embodiment, the driving voltage generator may generate the black data voltage by receiving a grayscale expression voltage, and the driving controller may determine a first offset voltage of the grayscale expression voltage based on the black data set voltage, calculate a first correction grayscale expression voltage by adding the first offset voltage of the grayscale expression voltage to a grayscale expression set voltage, determine a second offset voltage of the grayscale expression voltage based on the first correction black data voltage, calculate a second correction grayscale expression voltage by adding the second offset voltage of the grayscale expression voltage to the first correction grayscale expression voltage, determine a third offset voltage of the grayscale expression voltage based on the second correction black data voltage, calculate a third correction grayscale expression voltage by adding the third offset voltage of the grayscale expression voltage to the second correction grayscale expression voltage, and determine the third correction grayscale expression voltage as the grayscale expression voltage.

In an embodiment, the driving voltage generator may provide a gate high voltage to the gate driver, and the driving controller may determine a first offset voltage of the gate high voltage based on the first correction grayscale expression voltage, calculate a first correction gate high voltage by adding the first offset voltage of the gate high voltage to a gate high set voltage, determine a second offset voltage of the gate high voltage based on the second correction grayscale expression voltage, calculate a second correction gate high voltage by adding the second offset voltage of the gate high voltage to the first correction gate high voltage, determine a third offset voltage of the gate high voltage based on the temperature, calculate a third correction gate high voltage by adding the third offset voltage of the gate high voltage to the second correction gate high voltage, and determine the third correction gate high voltage as the gate high voltage.

In an embodiment, the display device may further include a power supply which provides a source voltage to the driving voltage generator, the driving voltage generator may generate the gate high voltage by receiving the source voltage, and the driving controller may determine a first offset voltage of the source voltage based on the first correction gate high voltage, calculate a first correction source voltage by adding the first offset voltage of the source voltage to a source set voltage, determine a second offset voltage of the source voltage based on the second correction gate high voltage, calculate a second correction source voltage by adding the second offset voltage of the source voltage to the first correction source voltage, determine a third offset voltage of the source voltage based on the third correction gate high voltage, calculate a third correction source voltage by adding the third offset voltage of the source voltage to the second correction source voltage, and determine the third correction source voltage as the source voltage.

In an embodiment, the driving voltage generator may provide a gate low voltage to the gate driver, and the driving controller may determine an offset voltage of the gate low voltage based on an initialization voltage of the sub-pixel.

In an embodiment, the driving voltage generator may provide a gate low voltage to the gate driver, and the driving controller may determine a first offset voltage of the gate low voltage based on an initialization voltage of the sub-pixel, calculate a first correction gate low voltage by adding the first offset voltage of the gate low voltage to a gate low set voltage, determine a second offset voltage of the gate low voltage based on the temperature, calculate a second correction gate low voltage by adding the second offset voltage of the gate low voltage to the first correction gate low voltage, and determine the second correction gate low voltage as the gate low voltage.

According to embodiments of the disclosure, a method of driving a display device may include determining an offset voltage of a black data voltage based on at least one selected from a driving frequency, a dimming level, and a temperature, determining an offset voltage of a grayscale expression voltage based on the black data voltage, determining an offset voltage of a gate high voltage based on the grayscale expression voltage, determining an offset voltage of a source voltage based on the gate high voltage, and selecting a mode for generating a reference voltage based on a gate low voltage.

According to embodiments of the disclosure, an electronic device may include a processor which provides input image data to a display device, the display device which displays an image based on the input image data, and a power supply which supplies power to the display device, and the display device may include a display panel including a sub-pixel, a gate driver which provides a gate signal to the sub-pixel, a data driver which provide a data voltage to the sub-pixel, a driving voltage generator which provides a gamma reference voltage including a black data voltage to the data driver, and a driving controller which determines an offset voltage of the black data voltage based on at least one selected from a driving frequency, a dimming level, and a temperature.

The display device according to embodiments of the disclosure may determine the offset voltage of the black data voltage based on the driving frequency, the dimming level, and/or the temperature, to set an optimal black data voltage corresponding to the driving frequency, the dimming level, and/or the temperature.

However, an effect of the disclosure is not limited to the above-described effect, and may be variously expanded within a range that does not deviate from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
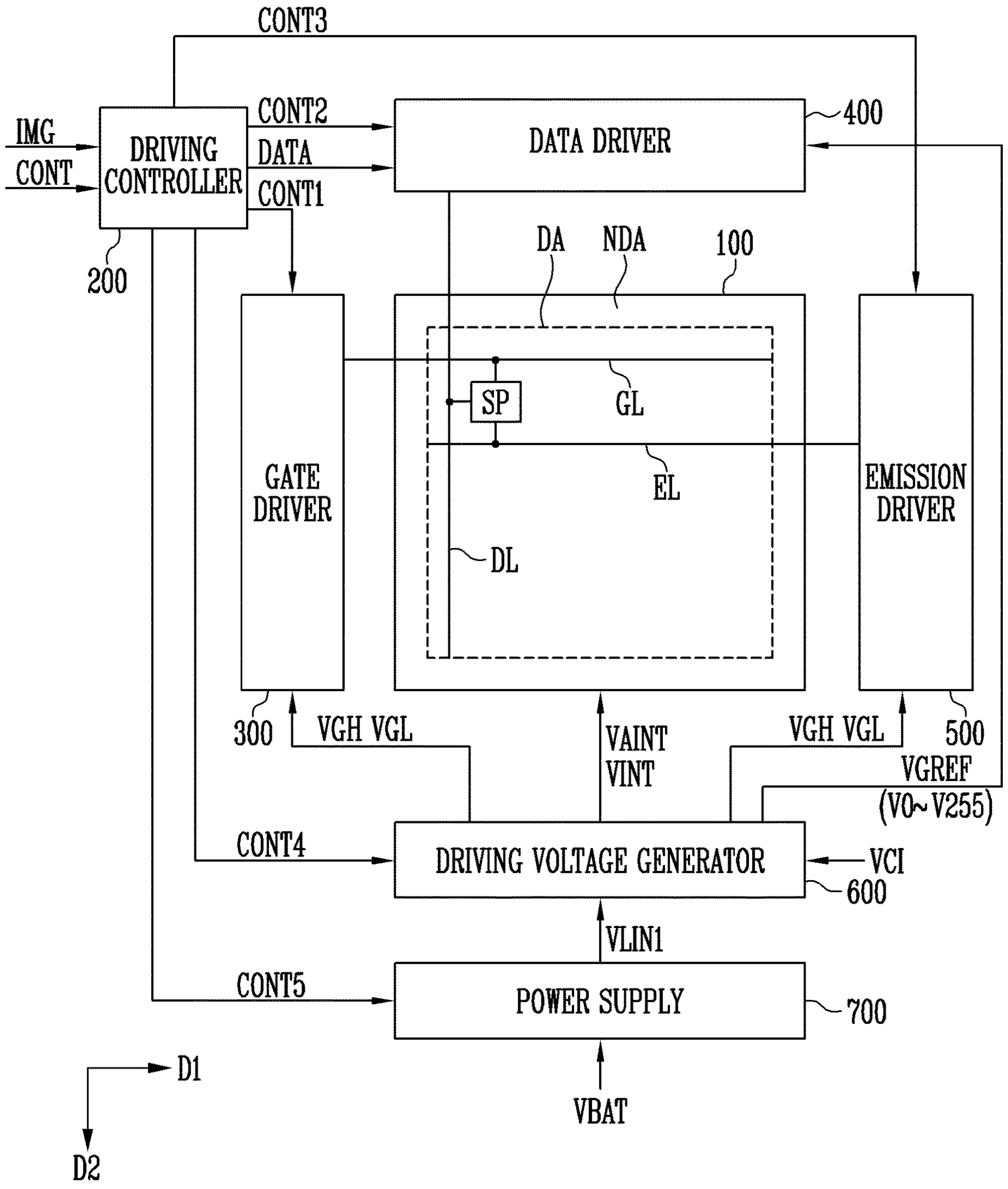
FIG. 1 is a block diagram illustrating a display device according to embodiments of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. At least any one of X, Y, and Z" and "at least any one selected from X, Y, and Z" may be interpreted as one X, one Y, one Z, or any combination of two or more of X, Y, and Z (for example, XYZ, XYY, YZ, and ZZ). It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the present embodiments are not limited thereto.

FIG. 1 is a block diagram illustrating a display device according to embodiments of the disclosure.

Referring to FIG. 1, an embodiment of the display device may include a display panel 100, a driving controller 200, a gate driver 300, a data driver 400, an emission driver 500, a driving voltage generator 600, and a power supply 700. In an embodiment, the driving controller 200 and the data driver 400 may be integrated into one chip. In an embodiment, the driving controller 200, the data driver 400, and the driving voltage generator 600 may be integrated into one chip.

The display panel 100 may include a display area DA for displaying an image and a non-display area NDA disposed adjacent to the display area DA. In an embodiment, the gate driver 300 and the emission driver 500 may be mounted in the non-display area NDA.

The display panel 100 may include a plurality of gate lines GL, a plurality of data lines DL, a plurality of emission lines EL, and a plurality of sub-pixels SP electrically connected to the gate lines GL, the data lines DL, and the emission lines EL. The gate lines GL and the emission lines EL may extend in a first direction DR1, and the data lines DL may extend in a second direction DR2 crossing the first direction DR1.

The driving controller 200 may receive input image data IMG and an input control signal CONT from a processor (for example, a graphic processing unit (GPU) or the like). In an embodiment, for example, the input image data IMG may include red image data, green image data, and blue image data. In an embodiment, the input image data IMG may further include white image data. In an alternative embodiment, for example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, a fifth control signal CONT5, and a data signal DATA based on the input image data IMG and the input control signal CONT.

The driving controller 200 may generate the first control signal CONT1 for controlling an operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling an operation of the data driver 400 based on the input control signal CONT and output the second control signal CONT2 to the data driver 400. The second control signal CONT2 may include a horizontal start signal and a load signal.

The driving controller 200 may generate the data signal DATA by receiving the input image data IMG and the input control signal CONT. The driving controller 200 may output the data signal DATA to the data driver 400.

The driving controller 200 may generate the third control signal CONT3 for controlling an operation of the emission driver 500 based on the input control signal CONT and output the third control signal CONT3 to the emission driver 500. The third control signal CONT3 may include a vertical start signal and an emission clock signal.

The driving controller 200 may generate the fourth control signal CONT4 for controlling an operation of the driving voltage generator 600 based on the input control signal CONT and output the fourth control signal CONT4 to the driving voltage generator 600. The driving voltage generator 600 may output driving voltages VGH, VGL, VINT, and VAINT with voltage values (or levels) determined by the driving controller 200.

The driving controller 200 may generate the fifth control signal CONT5 for controlling an operation of the power supply 700 based on the input control signal CONT and output the fifth control signal CONT5 to the power supply 700. The power supply 700 may output a source voltage VLIN1 as a voltage value determined by the driving controller 200.

The gate driver 300 may generate gate signals for driving the gate lines GL in response to the first control signal CONT1 received from the driving controller 200. The gate driver 300 may output the gate signals to the gate lines GL. In an embodiment, for example, the gate driver 300 may sequentially output the gate signals to the gate lines GL.

The data driver 400 may receive the second control signal CONT2 and the data signal DATA from the driving controller 200. The data driver 400 may generate data voltages obtained by converting the data signal DATA into an analog voltage. The data driver 400 may output the data voltages to the data lines DL.

The emission driver 500 may generate emission signals for driving the emission lines EL in response to the third control signal CONT3 received from the driving controller 200. The emission driver 500 may output the emission signals to the emission lines EL. In an embodiment, for example, the emission driver 500 may sequentially output the emission signals to the emission lines EL.

The driving voltage generator 600 may provide a gate high voltage VGH and a gate low voltage VGL to the gate driver 300 and the emission driver 500 in response to the fourth control signal CONT4 received from the driving controller 200. The gate high voltage VGH may be a voltage corresponding to a high voltage level of the gate signal, and the gate low voltage VGL may be a voltage corresponding to a low voltage level of the gate signal.

The driving voltage generator 600 may apply a first initialization voltage VINT and a second initialization voltage VAINT to the display panel 100 in response to the fourth control signal CONT4 received from the driving controller 200. Detailed features of the first initialization voltage VINT and the second initialization voltage VAINT will be described later.

The driving voltage generator 600 may provide a gamma reference voltage VGREF to the data driver 400 in response to the fourth control signal CONT4 received from the driving controller 200. The gamma reference voltage VGREF may include a data voltage V0 of 0 grayscale (that is, a black data voltage) to a data voltage V255 of 255 grayscales. The data driver 400 may output a data voltage of each grayscale using the gamma reference voltage VGREF.

The driving voltage generator 600 may receive a first external voltage VCI (shown in FIG. 6) and generate a reference voltage VLOUT3 (shown in FIG. 6) to be described later. Detailed features of this will be described later. The power supply 700 may provide the source voltage VLIN1 (shown in FIG. 6) to the driving voltage generator 600 in response to the fifth control signal CONT5 received from the driving controller 200. The power supply 700 may generate the source voltage VLIN1 by receiving a second external voltage VBAT. In an embodiment, for example, the power supply 700 may be a power management integrated circuit (PMIC).

Figure 2:
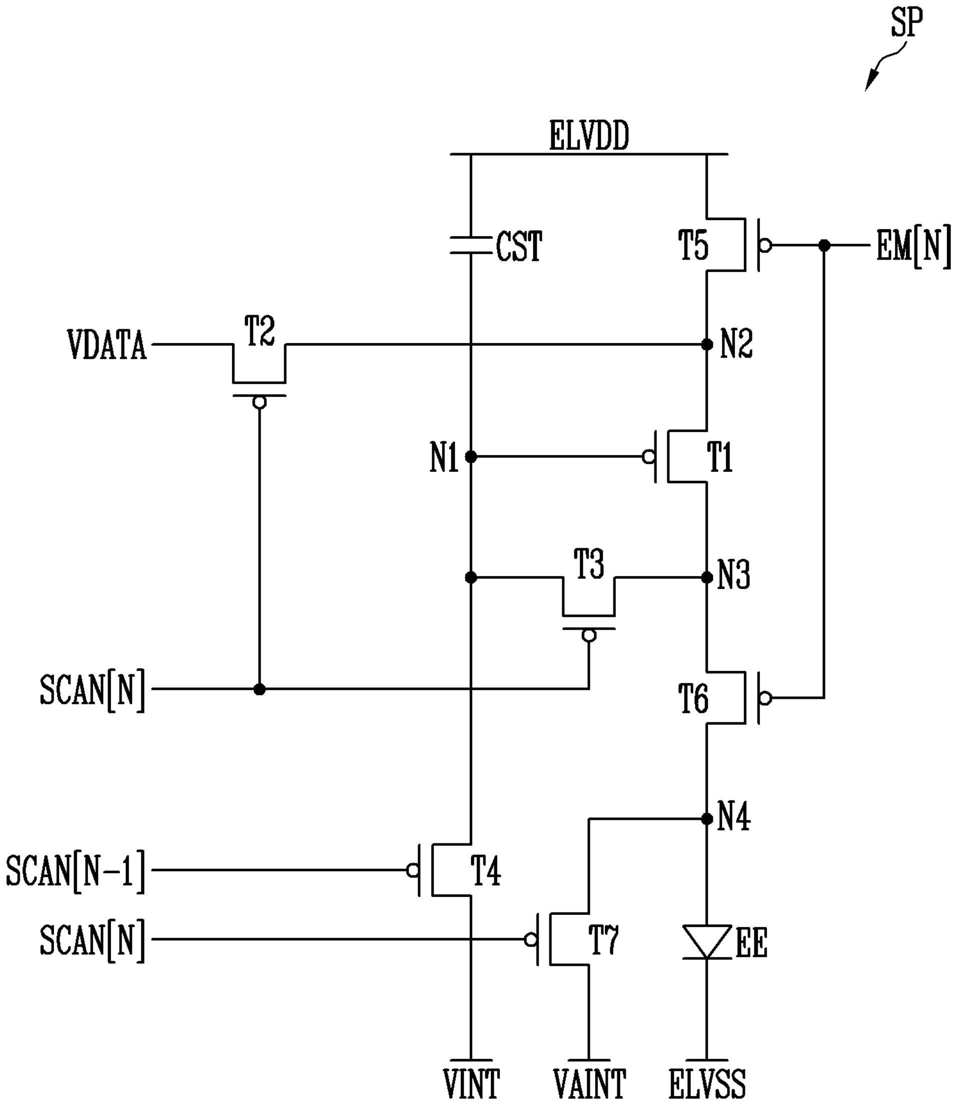
FIG. 2 is a circuit diagram illustrating an embodiment of a sub-pixel of the display device of FIG. 1.

FIG. 2 is a circuit diagram illustrating an embodiment of the sub-pixel of the display device of FIG. 1.

Referring to FIG. 2, in an embodiment, each of the sub-pixels SP may include a driving transistor T1, switching transistors T2 to T7, and a light emitting element EE.

In an embodiment, for example, each of the sub-pixels SP may include the first transistor T1 (that is, the driving transistor) including a control electrode (or a gate electrode) connected to a first node N1, a first electrode connected to a second node N2, and a second electrode connected to a third node N3, the second transistor T2 including a control electrode that receives a gate signal SCAN[N], a first electrode that receives a data voltage VDATA, and a second electrode connected to the second node N2, the third transistor T3 including a control electrode that receives the gate signal SCAN[N], a first electrode connected to the third node N3, and a second electrode connected to the first node N1, a fourth transistor T4 including a control electrode that receives a gate signal SCAN[N−1] of a previous pixel row, a first electrode that receives a first initialization voltage VINT, and a second electrode connected to the first node N1, a fifth transistor T5 including a control electrode that receives an emission signal EM [N], a first electrode that receives a first power voltage ELVDD (for example, a high power voltage), and a second electrode connected to the second node N2, a sixth transistor T6 including a control electrode that receives the emission signal EM [N], a first electrode connected to the third node N3, and a second electrode connected to a fourth node N4, a seventh transistor T7 including a control electrode that receives the gate signal SCAN[N], a first electrode that receives a second initialization voltage VAINT, and a second electrode connected to the fourth node N4, a storage capacitor CST including a first electrode receiving the first power voltage ELVDD and a second electrode connected to the first node N1, and the light emitting element EE including a first electrode (that is, an anode electrode) connected to the fourth node N4 and a second electrode that receives a second power voltage ELVSS (for example, a low power voltage). However, the disclosure is not limited thereto. In an alternative embodiment, for example, each of the sub-pixels SP may have a 3T1C structure including three transistors and one capacitor, a 5T2C structure including five transistors and two capacitors, a 7T1C structure including seven transistors and one capacitor, a 9T1C structure including nine transistors and one capacitor, or the like.

In an embodiment, the first to seventh transistors T1, T2, T3, T4, T5, T6, and T7 may be implemented as p-channel metal oxide semiconductor (PMOS) transistors. In such an embodiment, a low voltage level may be an activation level, and a high voltage level may be an inactivation level. For example, when a signal applied to a control electrode of the PMOS transistor has the low voltage level, the PMOS transistor may be turned on. For example, when a signal applied to the control electrode of the PMOS transistor has the high voltage level, the PMOS transistor may be turned off.

However, the disclosure is not limited thereto. In an alternative embodiment, for example, the first to seventh transistors T1, T2, T3, T4, T5, T6, and T7 may be implemented as n-channel metal oxide semiconductor (NMOS) transistors. In such an embodiment, a low voltage level may be an inactivation level, and a high voltage level may be an activation level. For example, when a signal applied to a control electrode of the NMOS transistor has the low voltage level, the NMOS transistor may be turned off. For example, when a signal applied to the control electrode of the NMOS transistor has the high voltage level, the NMOS transistor may be turned on. That is, the activation level and the inactivation level may be determined according to a type of a transistor.

For example, in an initialization period, the gate signal SCAN[N−1] of the previous pixel row may have the activation level, and the fourth transistor T4 may be turned on. Accordingly, the first initialization voltage VINT (hereinafter, referred to as a gate initialization voltage) may be applied to the first node N1 (that is, a gate initialization operation). That is, the control electrode (or the storage capacitor CST) of the first transistor T1 may be initialized.

For example, in a data writing and anode initialization period, the gate signal SCAN[N] may have the activation level, and the second transistor T2, the third transistor T3, and the seventh transistor T7 may be turned on. Accordingly, the data voltage VDATA may be written to the storage capacitor CST, and the second initialization voltage VAINT (hereinafter, referred to as an anode initialization voltage) may be applied to the first electrode (that is, the anode electrode) of the light emitting element EE.

For example, in an emission period, the emission signal EM [N] may have the activation level, and the fifth transistor T5 and the sixth transistor T6 may be turned on. Accordingly, the first power voltage ELVDD may be applied to the first transistor T1 to generate a driving current, and the driving current may be applied to the light emitting element EE. That is, the light emitting element EE may emit light with a luminance corresponding to the driving current.

Figure 3:
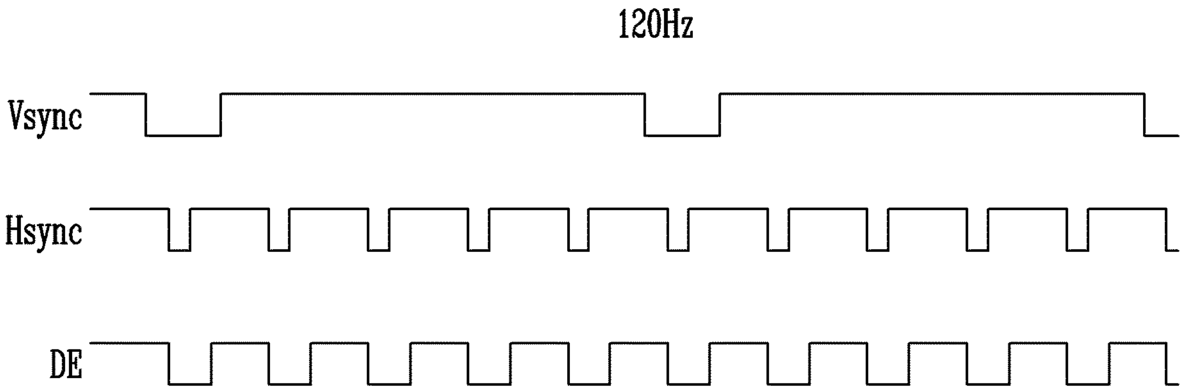
FIG. 3 is a signal timing diagram illustrating an example in which the display device of FIG. 1 operates at a driving frequency of 120 Hz.
Figure 4:
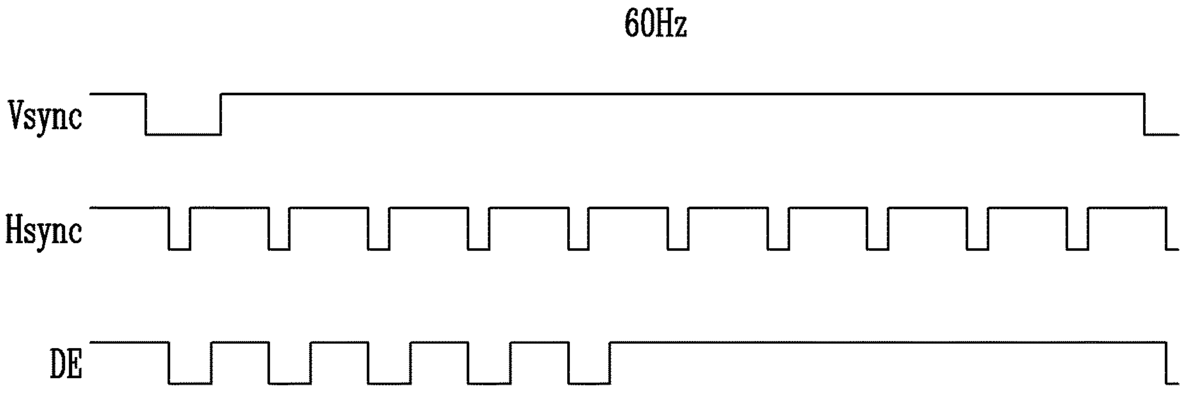
FIG. 4 is a signal timing diagram illustrating an example in which the display device of FIG. 1 operates at a driving frequency of 60 Hz.

FIG. 3 is a signal timing diagram illustrating an example in which the display device of FIG. 1 operates at a driving frequency of 120 Hz, and FIG. 4 is a signal timing diagram illustrating an example in which the display device of FIG. 1 operates at a driving frequency of 60 Hz.

Referring to FIGS. 1 to 4, in an embodiment, the input control signal CONT may include a vertical synchronization signal Vsync, a horizontal synchronization signal Hsync, and a data enable signal DE.

The vertical synchronization signal Vsync may include a plurality of pulses, and may indicate that a previous frame is ended and a current frame is started based on a time point at which each of the pulses is generated. An interval between adjacent pulses of the vertical synchronization signal Vsync may correspond to one frame. The horizontal synchronizing signal Hsync may include a plurality of pulses and may indicate that a previous horizontal period is ended and a new horizontal period is started based on a time point at which each of the pulses is generated. The data enable signal DE may indicate that the input image data IMG is supplied in a horizontal period. The input image data IMG may be supplied in a form of the data voltage VDATA in a pixel row unit in horizontal periods in correspondence with the data enable signal DE.

In an embodiment, as shown in FIGS. 3 and 4, when the driving frequency decreases, a length of one frame may increase. In addition, the data enable signal DE may not have pulses in a period in which the length of one frame is increased. The data voltage VDATA may not be written in a period in which the data enable signal DE does not have pulses. While the data voltage VDATA is not written, a voltage stored in the storage capacitor CST may be leaked through the third and fourth transistors T3 and T4. That is, when a same data voltage VDATA is written even though a driving frequency is different, a luminance difference may be caused due to the leaked current. In an embodiment, the driving controller 200 may minimize the luminance difference by determining an offset voltage of the black data voltage or a black data set voltage based on the driving frequency. A detailed description of this is given later.

Figure 5:
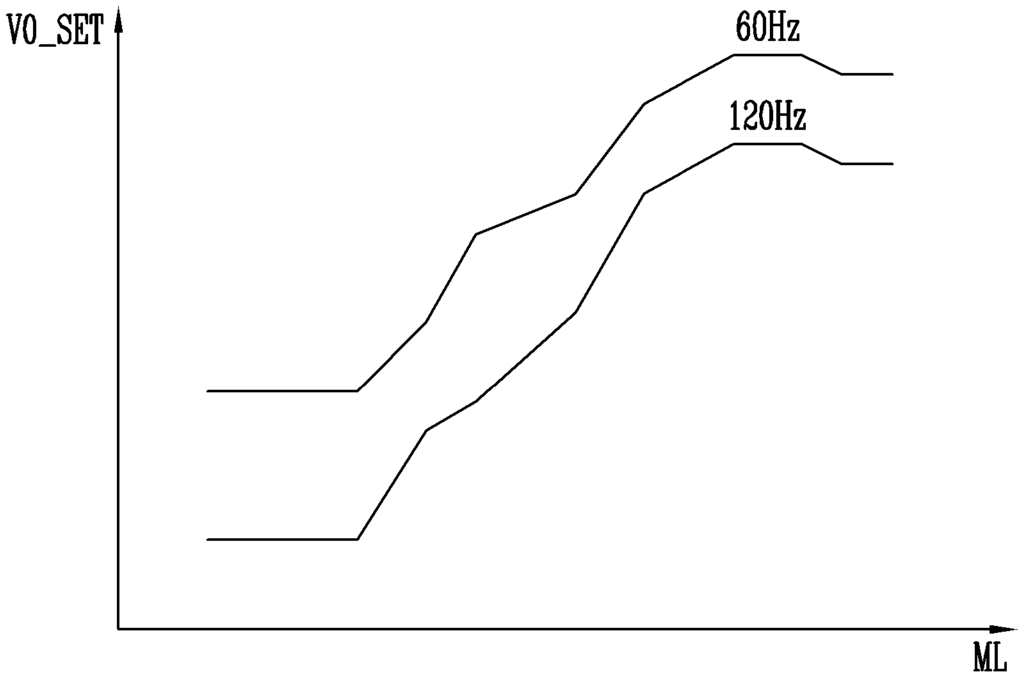
FIG. 5 is a graph illustrating an example in which the display device of FIG. 1 determines a black data set voltage based on a driving frequency.

FIG. 5 is a graph illustrating an example in which the display device of FIG. 1 determines the black data set voltage based on the driving frequency.

Referring to FIGS. 1 and 5, in an embodiment, the driving controller 200 may determine a black data set voltage V0_SET based on the driving frequency. The driving controller 200 may determine a black data voltage V0 by adding an offset voltage of the black data voltage V0 to the black data set voltage V0_SET.

The black data voltage may be a maximum value among data voltages. In an embodiment, for example, as shown in FIG. 2, the driving transistor may be implemented as a PMOS transistor. In such an embodiment, as a gate voltage of the driving transistor increases, a driving current may decrease. Accordingly, the data voltage may have a maximum value in a black grayscale (that is, 0 grayscale).

As shown in FIG. 5, the black data set voltage V0_SET may decrease as a dimming level ML decreases. In an embodiment, the black data set voltage V0_SET may increase as the dimming level ML decreases in a partial section of a high dimming level ML. In an embodiment, the black data set voltage V0_SET may be constant regardless of the dimming level ML in a partial period of a low dimming level ML.

The driving controller 200 may decrease a data range of the data voltage at the low dimming level ML by decreasing the black data set voltage V0_SET as the dimming level ML decreases. In addition, as the data range of the data voltage is decreased, instantaneous afterimages due to a hysteresis characteristic of the driving transistor at a low luminance (for example, the low dimming level ML) may be minimized.

In an embodiment, a gamma curve of the display device may be adjusted by adjusting the dimming level ML. For example, the dimming level ML may be set by a user. For example, as the dimming level ML decreases, a maximum luminance displayed by the display device may decrease. For example, as the dimming level ML decreases, a luminance displayed by the display device may generally decrease.

In an embodiment, the black data set voltage V0_SET may decrease as the driving frequency increases. As described above, when a same data voltage is written while the driving frequency is changed, a luminance difference may be caused due to the leaked current. The driving controller 200 may minimize the luminance difference by determining the black data set voltage V0_SET based on the driving frequency.

Figure 6:
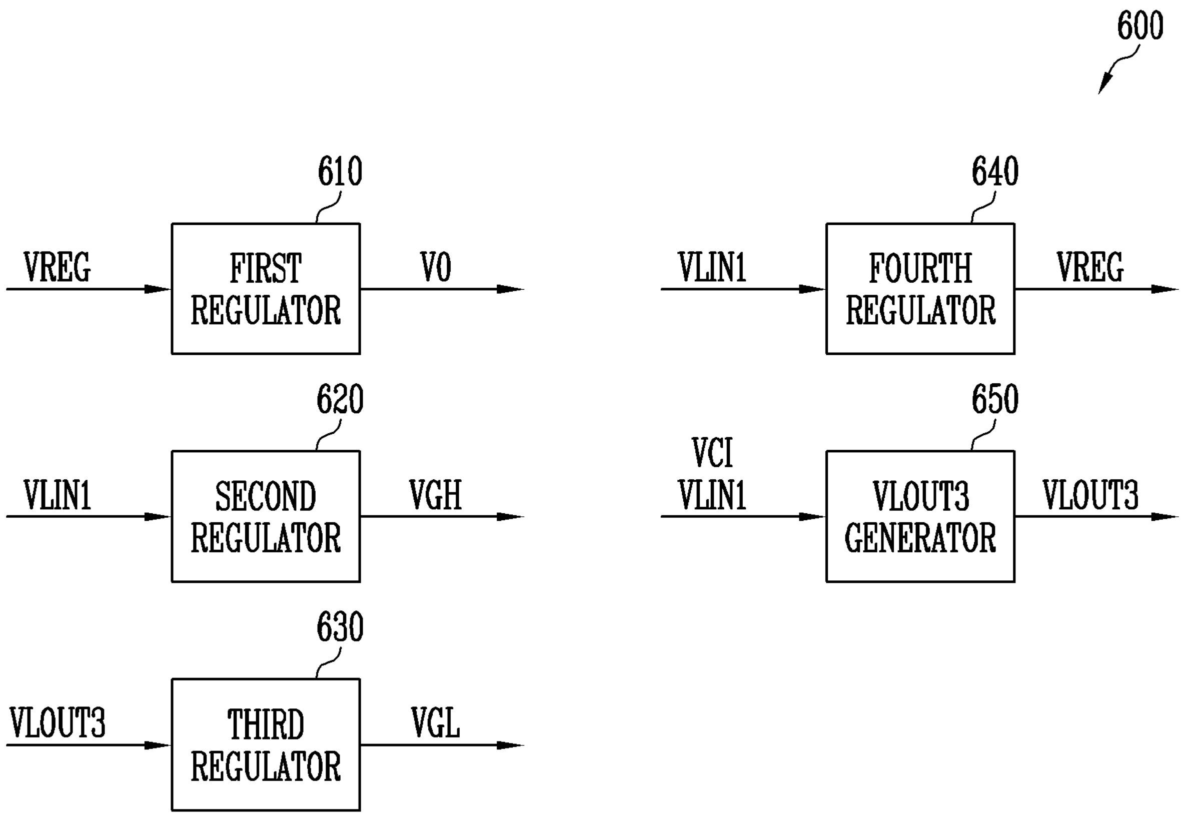
FIG. 6 is a block diagram illustrating an embodiment of a driving voltage generator of the display device of FIG. 1.

FIG. 6 is a block diagram illustrating an embodiment of the driving voltage generator of the display device of FIG. 1.

Referring to FIG. 6, an embodiment of the driving voltage generator 600 may include a first regulator 610, a second regulator 620, a third regulator 630, a fourth regulator 640, and a reference voltage generator 650.

The first regulator 610 may generate the black data voltage V0 by receiving a grayscale expression voltage VREG. The first regulator 610 may generate the black data voltage V0 having a voltage value determined by the driving controller 200 by receiving the grayscale expression voltage VREG.

However, the disclosure is not limited thereto. In an embodiment, for example, where the driving transistor is implemented as an NMOS transistor, the first regulator 610 may generate a white data voltage (for example, a data voltage of 255 grayscales) having a voltage value determined by the driving controller 200 by receiving the grayscale expression voltage VREG.

In an embodiment, the first regulator 610 may generate the black data voltage V0 using the grayscale expression voltage VREG as a top voltage. In an embodiment, for example, the black data voltage V0 may be less than the grayscale expression voltage VREG. For example, the black data voltage V0 may have a voltage value in a range less than or equal to a voltage obtained by subtracting a headroom margin of the first regulator 610 from the grayscale expression voltage VREG.

The second regulator 620 may generate a gate high voltage VGH by receiving the source voltage VLIN1. The second regulator 620 may generate the gate high voltage VGH having a voltage value determined by the driving controller 200 by receiving the source voltage VLIN1.

In an embodiment, the second regulator 620 may generate the gate high voltage VGH using the source voltage VLIN1 as a top voltage. In an embodiment, for example, the gate high voltage VGH may be less than the source voltage VLIN1. For example, the gate high voltage VGH may have a voltage value in a range less than or equal to a voltage obtained by subtracting a headroom margin of the second regulator 620 from the source voltage VLIN1.

The third regulator 630 may generate a gate low voltage VGL by receiving the reference voltage VLOUT3. The third regulator 630 may generate the gate low voltage VGL having a voltage value determined by the driving controller 200 by receiving the reference voltage VLOUT3.

In an embodiment, the third regulator 630 may generate the gate low voltage VGL using the reference voltage VLOUT3 as a bottom voltage. In an embodiment, for example, the gate low voltage VGL may be greater than the reference voltage VLOUT3. For example, the gate low voltage VGL may have a voltage value in a range greater than or equal to a voltage value obtained by adding a headroom margin of the third regulator 630 to the reference voltage VLOUT3.

The fourth regulator 640 may generate the grayscale expression voltage VREG by receiving the source voltage VLIN1. The fourth regulator 640 may generate the grayscale expression voltage VREG having a voltage value determined by the driving controller 200 by receiving the source voltage VLIN1.

In an embodiment, the fourth regulator 640 may generate the grayscale expression voltage VREG using the source voltage VLIN1 as a top voltage. In an embodiment, for example, the grayscale expression voltage VREG may be less than the source voltage VLIN1. For example, the grayscale expression voltage VREG may have a voltage value in a range less than or equal to a voltage obtained by subtracting a headroom margin of the fourth regulator 640 from the source voltage VLIN1.

The reference voltage generator 650 may generate the reference voltage VLOUT3 by receiving the source voltage VLIN1 or the first external voltage VCI and the source voltage VLIN1. Detailed features of this will be described later.

Figure 7:
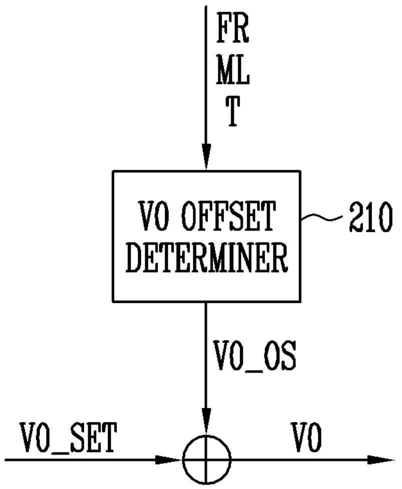
FIG. 7 is a diagram illustrating an example in which a driving controller of the display device of FIG. 1 determines a black data voltage.
Figure 8:
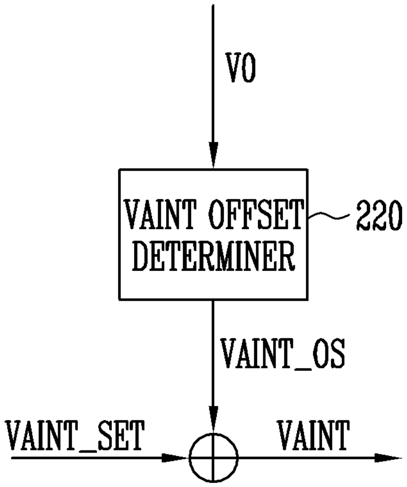
FIG. 8 is a diagram illustrating an example in which the driving controller of the display device of FIG. 1 determines an anode initialization voltage.
Figure 9:
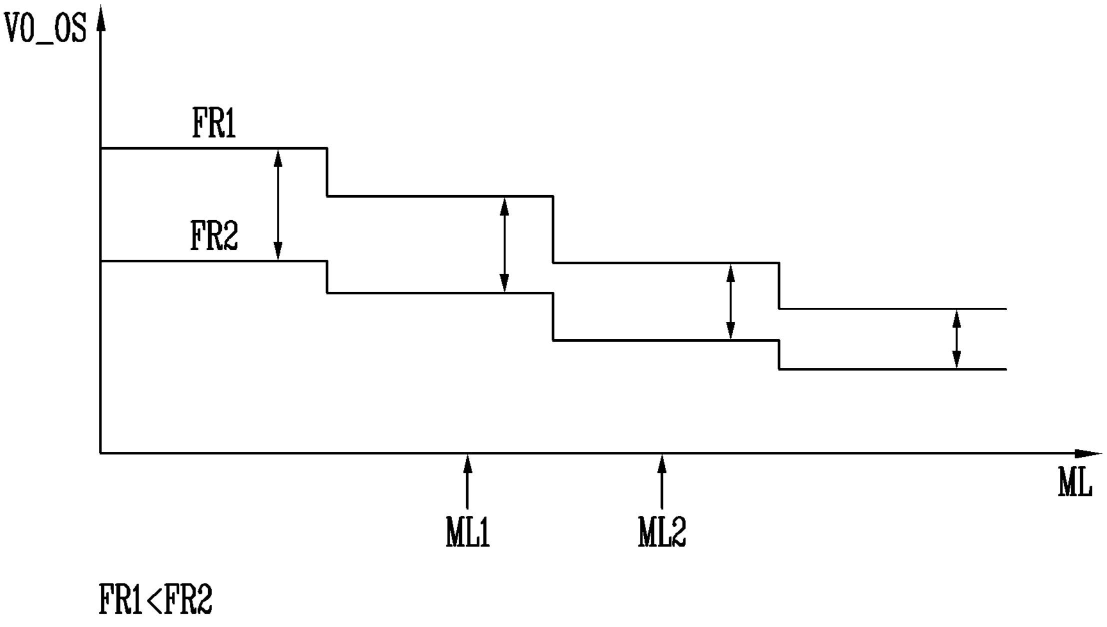
FIGS. 9 and 10 are graphs illustrating an example of an offset voltage of the black data voltage versus the driving frequency of the display device of FIG. 1.
Figure 10:
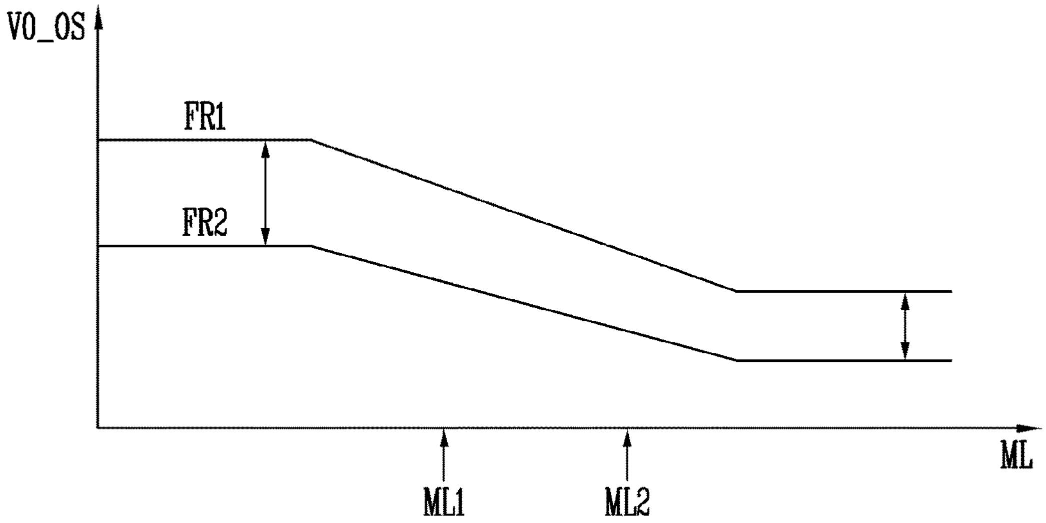
Figure 11:
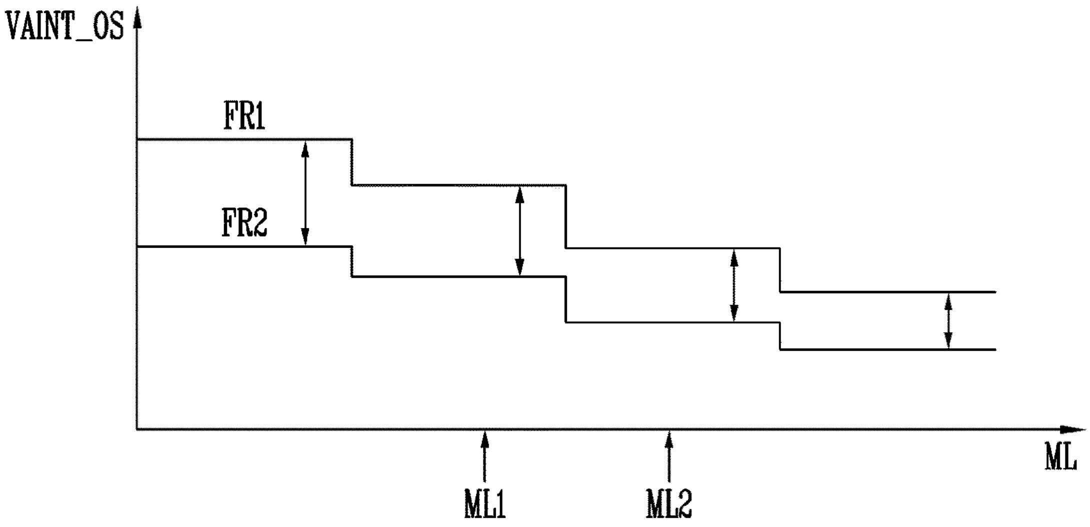
FIGS. 11 and 12 are graphs illustrating an example of an offset voltage of the anode initialization voltage versus the driving frequency of the display device of FIG. 1.
Figure 12:
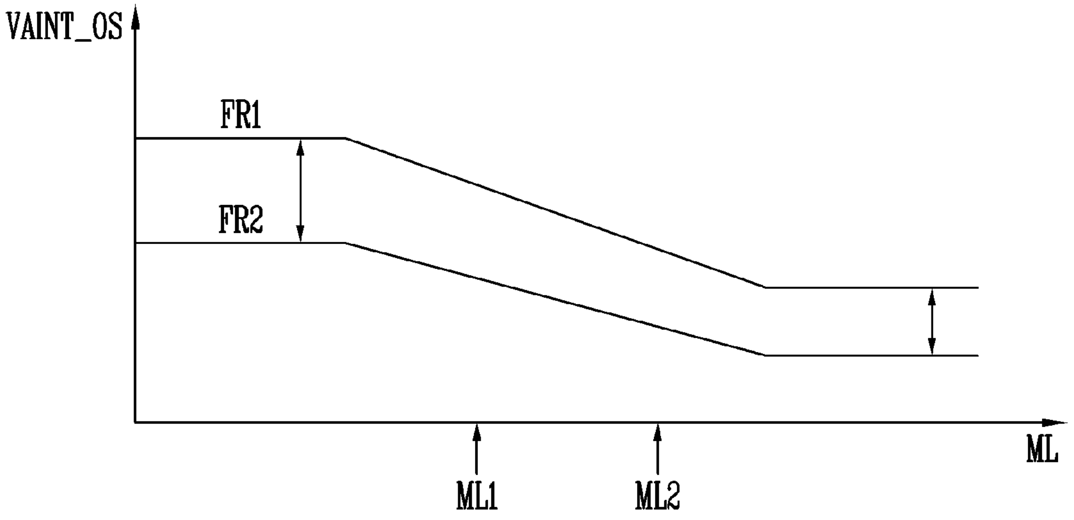
Figure 13:
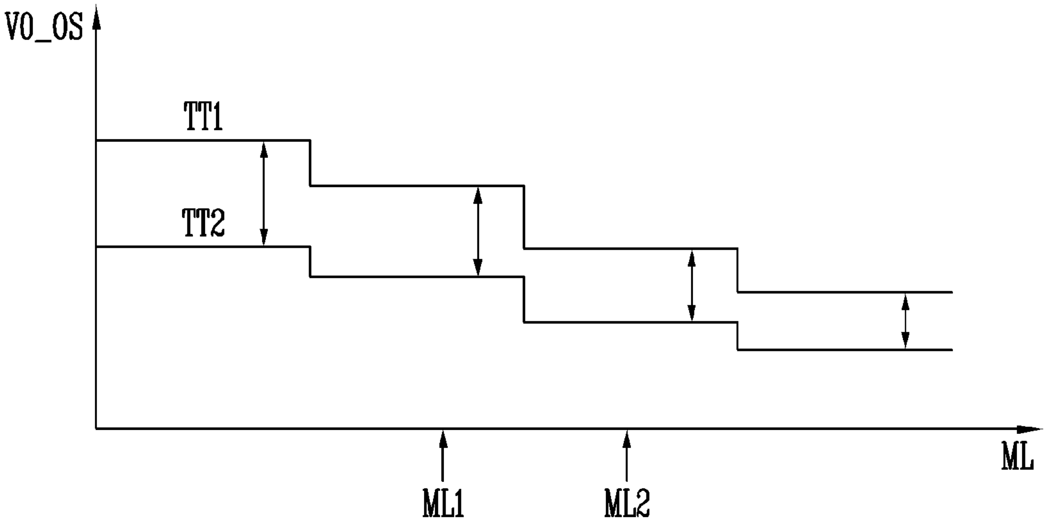
FIGS. 13 and 14 are graphs illustrating an example of the offset voltage of the black data voltage versus a temperature of the display device of FIG. 1.
Figure 14:
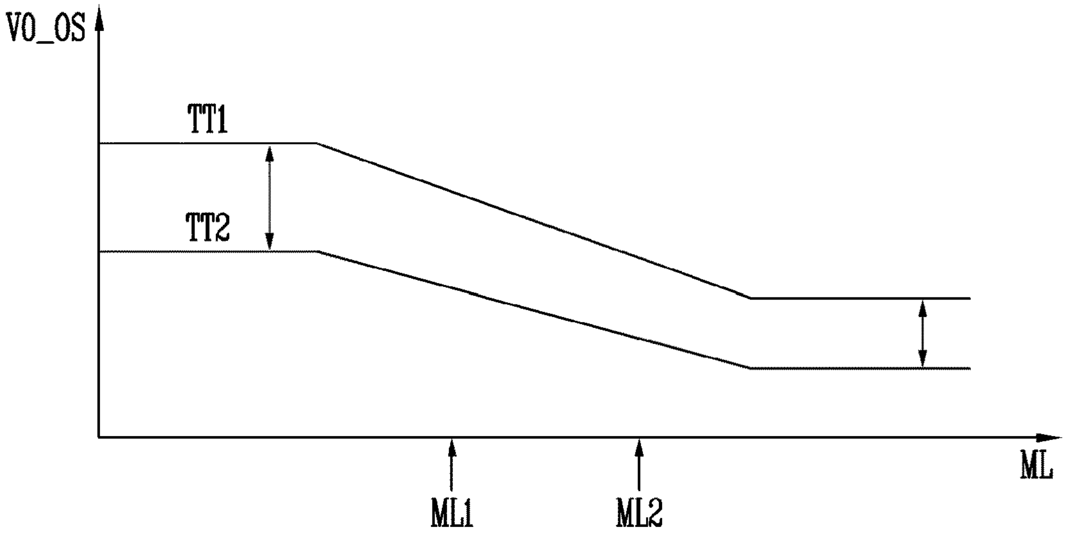
Figure 15:
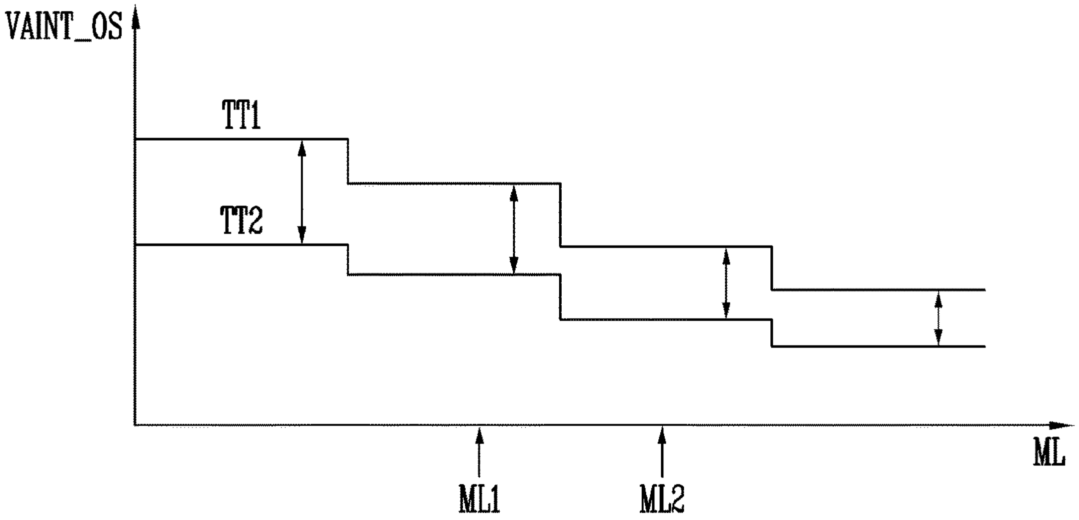
FIGS. 15 and 16 are graphs illustrating an example of the offset voltage of the anode initialization voltage versus the temperature of the display device of FIG. 1.
Figure 16:
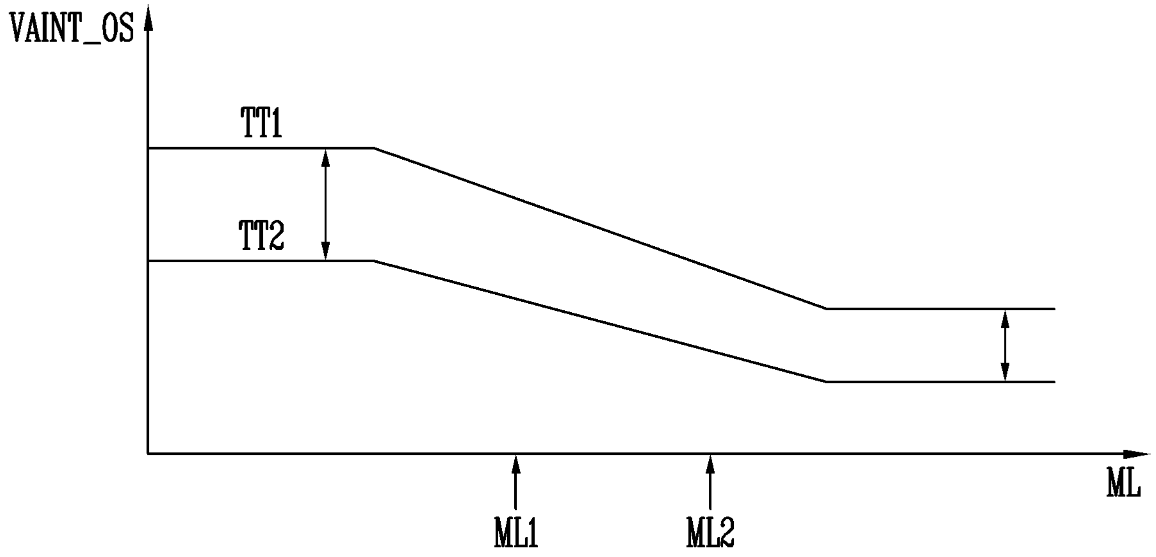

FIG. 7 is a diagram illustrating an example in which the driving controller of the display device of FIG. 1 determines the black data voltage, FIG. 8 is a diagram illustrating an example in which the driving controller of the display device of FIG. 1 determines the anode initialization voltage, FIGS. 9 and 10 are graphs illustrating an example of the offset voltage of the black data voltage versus the driving frequency of the display device of FIG. 1, FIGS. 11 and 12 are graphs illustrating an example of the offset voltage of the anode initialization voltage versus the driving frequency of the display device of FIG. 1, FIGS. 13 and 14 are graphs illustrating an example of the offset voltage of the black data voltage versus a temperature of the display device of FIG. 1, and FIGS. 15 and 16 are graphs illustrating an example of the offset voltage of the anode initialization voltage versus the temperature of the display device of FIG. 1.

V0 of FIG. 7 only indicates information on a voltage value of the black data voltage V0, and does not indicate that the driving controller 200 generates the black data voltage V0. That is, the driving controller 200 determines the voltage value of the black data voltage V0. This is the same for V0_SET and V0_OS of FIG. 7.

VAINT of FIG. 8 only indicates information on a voltage value of the anode initialization voltage VAINT, and does not indicate that the driving controller 200 generates the anode initialization voltage VAINT. That is, the driving controller 200 determines the voltage value of the anode initialization voltage VAINT. This is the same for VAINT_SET and VAINT_OS of FIG. 8.

Referring to FIGS. 1 and 7, an embodiment of the driving controller 200 may include a black data voltage offset determiner 210. The black data voltage offset determiner 210 may determine the offset voltage V0_OS of the black data voltage V0 based on at least one selected from the driving frequency FR, the dimming level ML, and the temperature T. Here, the temperature T may be a temperature of the display panel 100. In an embodiment, for example, the display device may further include a thermometer that measures the temperature of the display panel 100.

The black data voltage V0 may be determined as a sum of the offset voltage V0_OS of the black data voltage V0 and the black data set voltage V0_SET. The black data set voltage V0_SET may be the black data voltage before the offset voltage V0_OS of the black data voltage V0 is applied.

In an embodiment, the offset voltage V0_OS of the black data voltage V0 may have a value of 0 when the dimming level ML is greater than or equal to a preset reference level. In an embodiment, the offset voltage V0_OS of the black data voltage V0 may be applied when the dimming level ML is less than the preset reference level, and the black data set voltage V0_SET may be determined as the black data voltage V0 when the dimming level ML is greater than or equal to the preset reference level. At a low luminance (for example, the low dimming level ML), the luminance difference due to the leakage current may appear conspicuously or recognized easily. Therefore, the offset voltage V0_OS of the black data voltage V0 may be applied at the low dimming level ML.

In an embodiment, the black data voltage offset determiner 210 may determine the offset voltage V0_OS of the black data voltage V0 using a lookup table including the voltage value of the offset voltage V0_OS of the black data voltage V0. In an embodiment, for example, the lookup table may include the voltage value of the offset voltage V0_OS of the black data voltage V0 corresponding to the driving frequency FR, the dimming level ML, and/or the temperature T. In an embodiment, although not shown, the display device may further include a memory device that stores the lookup table.

In an embodiment, the black data voltage offset determiner 210 may determine the voltage value of the offset voltage V0_OS of the black data voltage V0 through an operation expression including the driving frequency FR, the dimming level ML, and/or the temperature T.

Referring to FIGS. 1, 2, 7, and 8, an embodiment of the driving controller 200 may include an anode initialization voltage offset determiner 220. The anode initialization voltage offset determiner 220 may determine the offset voltage VAINT_OS of the anode initialization voltage VAINT based on the black data voltage V0. In an embodiment, the offset voltage VAINT_OS of the anode initialization voltage VAINT may increase as the offset voltage V0_OS of the black data voltage V0 increases.

As the black data voltage V0 decreases, the driving current in the black grayscale (for example, 0 grayscale) may increase. In addition, as the driving current increases, a voltage charged in an internal capacitor of the light emitting element EE may increase. Accordingly, the anode initialization voltage VAINT may be determined to have a less value as the black data voltage V0 decreases. That is, when the black data voltage V0 increases, the anode initialization voltage VAINT may have a margin by an increase of the black data voltage V0, and even though the anode initialization voltage VAINT is increased by the margin, the anode electrode may be sufficiently initialized.

The anode initialization voltage VAINT may be determined as a sum of the offset voltage VAINT_OS of the anode initialization voltage VAINT and the anode initialization set voltage VAINT_SET. The anode initialization set voltage VAINT_SET may be an anode initialization voltage before the offset voltage VAINT_OS of the anode initialization voltage VAINT is applied. In an embodiment, the anode initialization set voltage VAINT_SET may be determined based on the black data set voltage V0_SET.

In an embodiment, the anode initialization set voltage VAINT_SET may be set as a low voltage value at the low grayscale (for example, the low dimming level ML) to prevent a luminance increase in the low grayscale (for example, the low dimming level ML). When the offset voltage VAINT_OS of the anode initialization voltage VAINT is not applied, a reverse bias may be applied to the light emitting element EE, and color drag may occur due to the reverse bias. The driving controller 200 may secure the margin of the anode initialization voltage VAINT by applying the offset voltage V0_OS of the black data voltage V0 at the low grayscale (for example, the low dimming level ML). The driving controller 200 may increase the anode initialization voltage VAINT by applying the offset voltage VAINT_OS of the anode initialization voltage VAINT corresponding to the margin of the anode initialization voltage VAINT. Accordingly, forward bias may be applied to the light emitting element EE, and the color drag may be minimized.

In an embodiment, the anode initialization voltage offset determiner 220 determines the offset voltage VAINT_OS of the anode initialization voltage VAINT based on the black data voltage V0, but the disclosure is not limited thereto. In an alternative embodiment, for example, the anode initialization voltage offset determiner 220 may determine the offset voltage VAINT_OS of the anode initialization voltage VAINT based on the offset voltage V0_OS of the black data voltage V0.

In an embodiment, the anode initialization voltage offset determiner 220 may determine the offset voltage VAINT_OS of the anode initialization voltage VAINT using a lookup table including a voltage value of the offset voltage VAINT_OS of the anode initialization voltage VAINT. For example, the lookup table may include a voltage value of the offset voltage VAINT_OS of the anode initialization voltage VAINT corresponding to the black data voltage V0 (or the offset voltage of the black data voltage V0).

In an embodiment, the anode initialization voltage offset determiner 220 may determine the voltage value of the offset voltage VAINT_OS of the anode initialization voltage VAINT through an operation expression including the black data voltage V0 (or the offset voltage of the black data voltage V0).

Referring to FIGS. 7 to 12, the offset voltage V0_OS of the black data voltage V0 may be less at a second dimming level ML2, which is greater than a first dimming level ML1, than at the first dimming level ML1 with respect to a same driving frequency and a same temperature. That is, the offset voltage V0_OS of the black data voltage V0 at the second dimming level ML2 may be less than the offset voltage V0_OS of the black data voltage V0 at the first dimming level ML1 with respect to the same driving frequency and temperature, i.e., when the driving frequency and the temperature are not changed. Similarly, the offset voltage VAINT_OS of the anode initialization voltage VAINT may be less at the second dimming level ML2 than at the first dimming level ML1 with respect to the same driving frequency and temperature. That is, the offset voltage VAINT_OS of the anode initialization voltage VAINT at the second dimming level ML2 may be less than the offset voltage VAINT_OS of the anode initialization voltage VAINT at the first dimming level ML1 with respect to the same driving frequency and temperature.

In an embodiment, as shown in FIGS. 9 and 11, the offset voltage V0_OS of the black data voltage V0 may decrease stepwise as the dimming level ML increases. Similarly, the offset voltage VAINT_OS of the anode initialization voltage VAINT may also decrease stepwise as the dimming level ML increases. In an alternative embodiment, as shown in FIGS. 10 and 12, the offset voltage V0_OS of the black data voltage V0 may continuously decrease as the dimming level ML increases in a preset range of dimming level, and may have a constant value in another preset range of dimming level. Similarly, the offset voltage VAINT_OS of the anode initialization voltage VAINT may also continuously decrease as the dimming level ML increases in a preset range of dimming level, and may have a constant value in another preset range of dimming level.

The offset voltage V0_OS of the black data voltage V0 may be less than at a second driving frequency FR2, which is greater than a first driving frequency FR1, than at the first driving frequency FR1 with respect to a same dimming level and a same temperature. That is, the offset voltage V0_OS of the black data voltage V0 at a second driving frequency FR2 may be less than at the second driving frequency FR2 than the offset voltage V0_OS of the black data voltage V0 at the first driving frequency FR1 with respect to the same dimming level and temperature, i.e., when the dimming level and temperature are not changed. Similarly, the offset voltage VAINT_OS of the anode initialization voltage VAINT may be less at the second driving frequency FR2 than at the first driving frequency FR1 with respect to a same dimming level. That is, the offset voltage VAINT_OS of the anode initialization voltage VAINT at the second driving frequency FR2 may be less than the offset voltage VAINT_OS of the anode initialization voltage VAINT at the first driving frequency FR1 with respect to the same dimming level and temperature.

As described above, as the driving frequency FR decreases, the leaked current amount may increase. Therefore, as the driving frequency FR decrease, the luminance difference due to the decreased driving frequency FR may be minimized by using the black data voltage V0 of the higher voltage.

In an embodiment, a difference between the black data voltages V0 at different driving frequencies (for example, the first driving frequency FR1 and the second driving frequency FR2) may be less than at the first dimming level ML1 than at the second dimming level ML2. That is, the difference between the black data voltages V0 at different driving frequencies (for example, the first driving frequency FR1 and the second driving frequency FR2) may decrease as the dimming level ML increases.

Referring to FIGS. 7, 8, and 13 to 16, the offset voltage V0_OS of the black data voltage V0 may be less at a second temperature TT2, which is less than a first temperature TT1, than at the first temperature TT1 with respect to a same dimming level and a same driving frequency. That is, the offset voltage V0_OS of the black data voltage V0 at the second temperature TT2 may be less at a second temperature TT2 than the offset voltage V0_OS of the black data voltage V0 at the first temperature TT1 with respect to the same dimming level and driving frequency, i.e., when the dimming level and the driving frequency are not changed. Similarly, the offset voltage VAINT_OS of the anode initialization voltage VAINT may be less at the second temperature TT2 which is less than the first temperature TT1. That is, the offset voltage VAINT_OS of the anode initialization voltage VAINT at the second temperature TT2 may be less than the offset voltage VAINT_OS of the anode initialization voltage VAINT at the first temperature TT1 with respect to the same dimming level and driving frequency. Due to the characteristic of the switching transistor, a current amount leaked at a high temperature may increase. Accordingly, the luminance difference due to the increased temperature T may be minimized by using the black data voltage V0 of the higher voltage as the temperature T increases.

Figure 17:
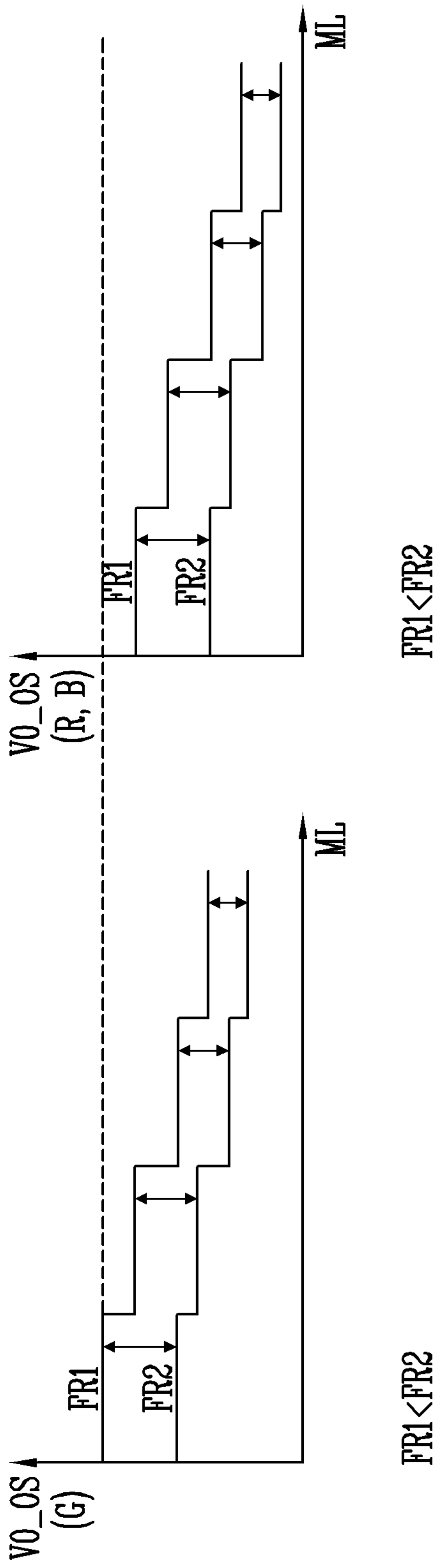
FIG. 17 is a graph illustrating that a display device according to embodiments of the disclosure determines the black data voltage for each sub-pixel.
Figure 18:
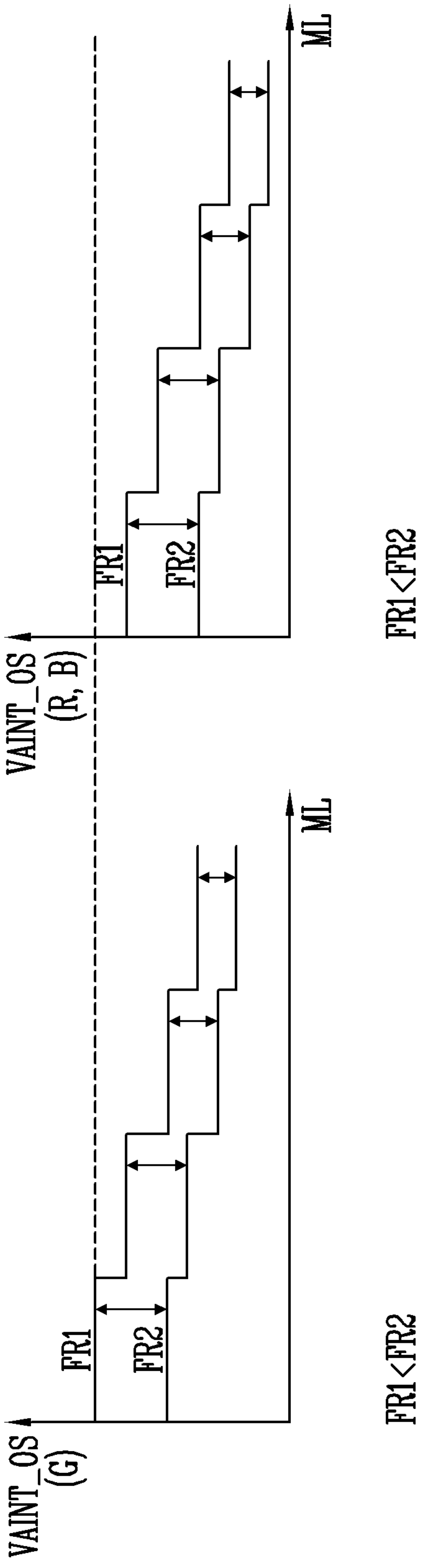
FIG. 18 is a graph illustrating an example in which the display device of FIG. 17 determines the anode initialization voltage for each sub-pixel.

FIG. 17 is a graph illustrating that a display device according to embodiments of the disclosure determines the black data voltage for each sub-pixel, and FIG. 18 is a graph illustrating an example in which the display device of FIG. 17 determines the anode initialization voltage for each sub-pixel.

Since the display device according to an embodiments is substantially the same as a configuration of the display device of FIG. 1 except that the display device determines the offset voltage V0_OS of the black data voltage V0 for each sub-pixel based on a type of the sub-pixel, the same reference numerals and reference symbols are used for identical or similar components, and any repetitive detailed description thereof will be omitted.

Referring to FIGS. 1, 2, 7, 8, 17, and 18, the sub-pixels SP may include a first color sub-pixel R that displays a first color, a second color sub-pixel G that displays a second color, and a third color sub-pixel B that displays a third color. For example, the first color may be red, the second color may be green, and the third color may be blue.

In an embodiment, the offset voltage V0_OS of the black data voltage V0 for the first color sub-pixel R may be less than the offset voltage V0_OS of the black data voltage V0 for the second color sub-pixel G. In an embodiment, the offset voltage V0_OS of the black data voltage V0 for the third color sub-pixel B may be less than the offset voltage V0_OS of the black data voltage V0 for the second color sub-pixel G with respect to a same dimming level, a same driving frequency and a same temperature.

Light efficiency of the sub-pixel SP may be different according to the color displayed by the sub-pixel SP. For example, light efficiency of the second color sub-pixel G may be better than light efficiency of the first color sub-pixel R and the third color sub-pixel B. In this case, the second color sub-pixel G may use a driving current less than that of the first color sub-pixel R and the third color sub-pixel B with respect to a same luminance (or dimming level). That is, the second color sub-pixel G may use the driving current less than that of the first color sub-pixel R and the third color sub-pixel B, and the internal capacitor of the light emitting element EE of the second color sub-pixel G may not be sufficiently charged due to the less driving current. Accordingly, the second color sub-pixel G may use an anode initialization voltage VAINT less than that of the first color sub-pixel R and the third color sub-pixel B. In addition, the second sub-pixel G may use a black data voltage V0 of a voltage low by a use of the anode initialization voltage VAINT of the low voltage.

In an embodiment, as shown in FIG. 17, the offset voltage V0_OS of the black data voltage V0 for the first color sub-pixel R and the offset voltage V0_OS of the black data voltage V0 for the third color sub-pixel B may be the same as each other, but the disclosure is not limited thereto.

In an embodiment, the offset voltage V0_OS of the black data voltage V0 for the first color sub-pixel R may be different from the offset voltage V0_OS of the black data voltage V0 for the third color sub-pixel B. For example, when light efficiency of the first color sub-pixel R is better than that of the third color sub-pixel B, the offset voltage V0_OS of the black data voltage V0 for the first color sub-pixel R may be greater than the offset voltage V0_OS of the black data voltage V0 for the third color sub-pixel B. For example, when light efficiency of the third color sub-pixel B is better than that of the first color sub-pixel R, the offset voltage V0_OS of the black data voltage V0 for the first color sub-pixel R may be less than the offset voltage V0_OS of the black data voltage V0 for the third color sub-pixel B.

Figure 19:
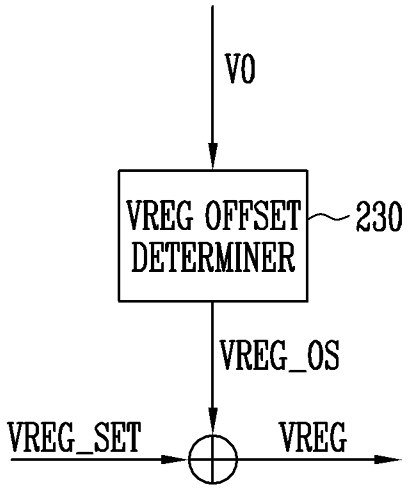
FIG. 19 is a diagram illustrating an example in which the driving controller of the display device of FIG. 1 determines a grayscale expression voltage.

FIG. 19 is a diagram illustrating an example in which the driving controller of the display device of FIG. 1 determines the grayscale expression voltage.

VREG of FIG. 19 only represents information on a voltage value of the grayscale expression voltage VREG, and does not indicate that the driving controller 200 generates the grayscale expression voltage VREG. That is, the driving controller 200 determines the voltage value of the grayscale expression voltage VREG. This is the same for VREG_SET and VREG_OS of FIG. 19.

Referring to FIGS. 1, 6, and 19, an embodiment of the driving controller 200 may include a grayscale expression voltage offset determiner 230. The grayscale expression voltage offset determiner 230 may determine the offset voltage VREG_OS of the grayscale expression voltage VREG based on the black data voltage V0. In an embodiment, the grayscale expression voltage VREG may be determined as a sum of the black data voltage V0 and the headroom margin of the first regulator 610.

The grayscale expression voltage VREG may be determined as a sum of the offset voltage VREG_OS of the grayscale expression voltage VREG and the grayscale expression set voltage VREG_SET. The grayscale expression set voltage VREG_SET may be a grayscale expression voltage before the offset voltage VREG_OS of the grayscale expression voltage VREG is applied. In an embodiment, the grayscale expression set voltage VREG_SET may be determined based on the black data set voltage V0_SET. In an embodiment, for example, the grayscale expression set voltage VREG_SET may be determined as a sum of the black data set voltage V0_SET and the headroom margin of the first regulator 610.

In the present embodiment, the grayscale expression voltage offset determiner 230 determines the offset voltage VREG_OS of the grayscale expression voltage VREG based on the black data voltage V0, but the disclosure is not limited thereto. In an embodiment, for example, the grayscale expression voltage offset determiner 230 may determine the offset voltage VREG_OS of the grayscale expression voltage VREG based on the offset voltage of the black data voltage V0.

In an embodiment, the grayscale expression voltage offset determiner 230 may determine the offset voltage VREG_OS of the grayscale expression voltage VREG by using a look-up table including a voltage value of the offset voltage VREG_OS of the grayscale expression voltage VREG. In an embodiment, for example, the lookup table may include the voltage value of the offset voltage VREG_OS of the grayscale expression voltage VREG corresponding to the black data voltage V0 (or the offset voltage of the black data voltage V0).

In an embodiment, the grayscale expression voltage offset determiner 230 may determine the voltage value of the offset voltage VREG_OS of the grayscale expression voltage VREG through an operation expression including the black data voltage V0 (or the offset voltage of the black data voltage V0).

Figure 20:
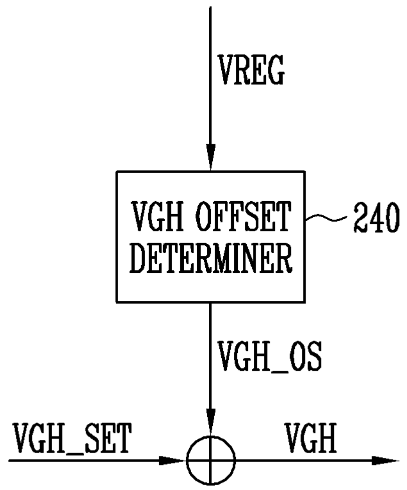
FIG. 20 is a diagram illustrating an example in which the driving controller of the display device of FIG. 1 determines a gate high voltage.

FIG. 20 is a diagram illustrating an example in which the driving controller of the display device of FIG. 1 determines the gate high voltage.

VGH of FIG. 20 only indicates information on a voltage value of the gate high voltage VGH, and does not indicate that the driving controller 200 generates the gate high voltage VGH. That is, the driving controller 200 determines the voltage value of the gate high voltage VGH. This is the same for VGH_SET and VGH_OS of FIG. 20.

Referring to FIGS. 1, 2, and 20, an embodiment of the driving controller 200 may include a gate high voltage offset determiner 240. The gate high voltage offset determiner 240 may determine the offset voltage VGH_OS of the gate high voltage VGH based on the grayscale expression voltage VREG. In an embodiment, the gate high voltage VGH may be determined as a sum of the grayscale expression voltage VREG and a threshold voltage of the switching transistors T2 to T7.

The gate high voltage VGH may be determined as a sum of the offset voltage VGH_OS of the gate high voltage VGH and the gate high set voltage VGH_SET. The gate high voltage VGH_SET may be a gate high voltage before the offset voltage VGH_OS of the gate high voltage VGH is applied. In an embodiment, the gate high set voltage VGH_SET may be determined based on the grayscale voltage set voltage VREG. In an embodiment, for example, the gate high set voltage VGH_SET may be determined as the sum of the grayscale expression set voltage VREG_SET and the threshold voltage of the switching transistors T2 to T7.

In the present embodiment, the gate high voltage offset determiner 240 determines the offset voltage VGH_OS of the gate high voltage VGH based on the grayscale expression voltage VREG, but the disclosure is not limited thereto. In an embodiment, for example, the gate high voltage offset determiner 240 may determine the offset voltage VGH_OS of the gate high voltage VGH based on the offset voltage of the grayscale expression voltage VREG.

In an embodiment, the gate high voltage offset determiner 240 may determine the offset voltage VGH_OS of the gate high voltage VGH by using a lookup table including a voltage value of the offset voltage VGH_OS of the gate high voltage VGH. In an embodiment, for example, the lookup table may include the voltage value of the offset voltage VGH_OS of the gate high voltage VGH corresponding to the grayscale expression voltage VREG (or the offset voltage of the grayscale expression voltage VREG).

In an embodiment, the grayscale expression voltage offset determiner 230 may determine the voltage value of the offset voltage VGH_OS of the gate high voltage VGH through an operation expression including the grayscale expression voltage VREG (or the offset voltage of the grayscale expression voltage VREG).

Figure 21:
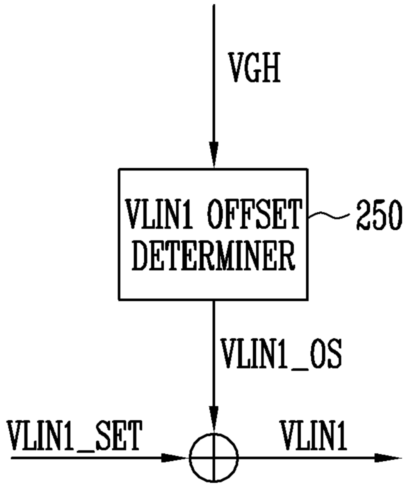
FIG. 21 is a diagram illustrating an example in which the driving controller of the display device of FIG. 1 determines a source voltage.

FIG. 21 is a diagram illustrating an example in which the driving controller of the display device of FIG. 1 determines the source voltage.

VLIN1 of FIG. 21 indicates only information on a voltage value of the source voltage VLIN1, and does not indicate that the driving controller 200 generates the source voltage VLIN1. That is, the driving controller 200 determines the voltage value of the source voltage VLIN1. This is the same for VLIN1_SET and VLIN1_OS of FIG. 19.

Referring to FIGS. 1, 6, and 21, an embodiment of the driving controller 200 may include a source voltage offset determiner 250. The source voltage offset determiner 250 may determine the offset voltage VLIN1_OS of the source voltage VLIN1 based on the gate high voltage VGH. In an embodiment, the source voltage VLIN1 may be determined as a sum of the gate high voltage VGH and the headroom margin of the second regulator 620.

The source voltage VLIN1 may be determined as a sum of the offset voltage VLIN1_OS of the source voltage VLIN1 and the source voltage set voltage VLIN1_SET. The source voltage set voltage VLIN1_SET may be a source voltage before the offset voltage VLIN1_OS of the source voltage VLIN1 is applied. In an embodiment, the source voltage set voltage VLIN1_SET may be determined based on the gate high set voltage VGH_SET. In an embodiment, for example, the source voltage set voltage VLIN1_SET may be determined as a sum of the gate high set voltage VGH_SET and the headroom margin of the second regulator 620.

In the present embodiment, the source voltage offset determiner 250 determines the offset voltage VLIN1_OS of the source voltage VLIN1 based on the gate high voltage VGH, but the disclosure is not limited thereto. In an embodiment, for example, the source voltage offset determiner 250 may determine the offset voltage VLIN1_OS of the source voltage VLIN1 based on the offset voltage of the gate high voltage VGH.

In an embodiment, the source voltage offset determiner 250 may determine the offset voltage VLIN1_OS of the source voltage VLIN1 using a lookup table including the voltage value of the offset voltage VLIN1_OS of the source voltage VLIN1. In an embodiment, for example, the lookup table may include the voltage value of the offset voltage VLIN1_OS of the source voltage VLIN1 corresponding to the gate high voltage VGH (or the offset voltage of the gate high voltage VGH).

In an embodiment, the source voltage offset determiner 250 may determine the gate high voltage VGH (or the offset voltage of the gate high voltage VGH) through an operation expression including the voltage value of the offset voltage VLIN1_OS of the source voltage VLIN1.

Figure 22:
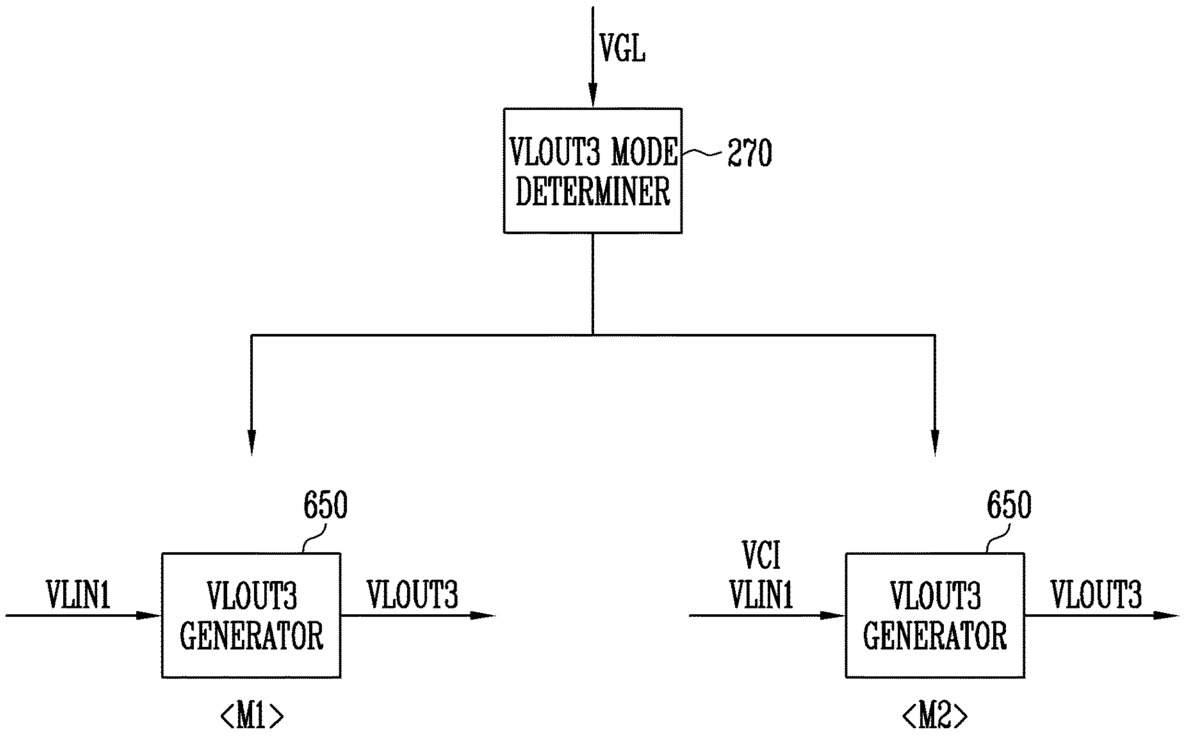
FIG. 22 is a diagram illustrating an example in which the driving controller of the display device of FIG. 1 determines a mode for generating a reference voltage.

FIG. 22 is a diagram illustrating an example in which the driving controller of the display device of FIG. 1 determines a mode for generating the reference voltage.

Referring to FIGS. 1, 6, and 22, an embodiment of the driving controller 200 may include a reference voltage mode determiner 270. The reference voltage mode determiner 270 may select one of the first mode M1 and the second mode M2 based on the gate low voltage VGL.

The reference voltage generator 650 may generate the reference voltage VLOUT3 based on the source voltage VLIN1 in the first mode M1 and generate the reference voltage VLOUT3 based on the source voltage VLIN1 and the first external voltage VCI in the second mode M2. In an embodiment, the reference voltage VLOUT3 in the first mode M1 may be a voltage corresponding to the source voltage VLIN1, and the reference voltage VLOUT3 in the second mode M2 may be a voltage corresponding to a sum of the source voltage VLIN1 and the first external voltages VCI. That is, an absolute value of the reference voltage VLOUT3 in the second mode M2 may be greater than an absolute value of the reference voltage VLOUT3 in the first mode M1.

In an embodiment, the reference voltage mode determiner 270 may select the second mode M2 among the first mode M1 and the second mode M2 when a sum of an absolute value of the gate low voltage VGL and the headroom margin of the third regulator 630 is greater than the absolute value of the voltage corresponding to the source voltage VLIN1.

As described above, the display device may reduce undesired power loss by optimizing different driving voltages (for example, the grayscale expression voltage VREG, the gate high voltage VGH, the source voltage VLIN1, and the reference voltage VLOUT3) based on the black data voltage.

Figure 23:
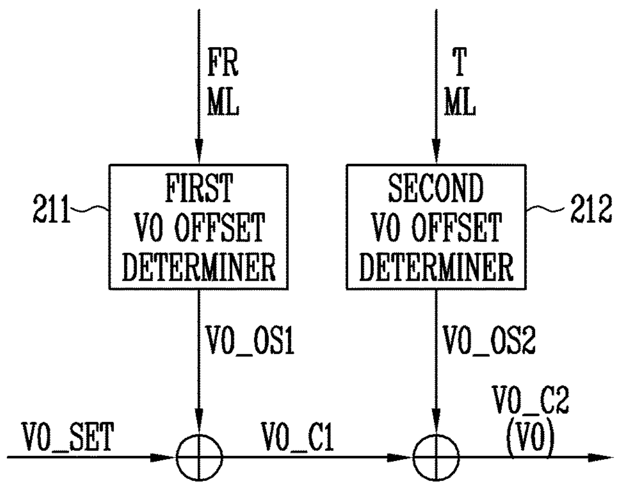
FIG. 23 is a diagram illustrating an example in which the driving controller of the display device according to embodiments of the disclosure determines the black data voltage.
Figure 24:
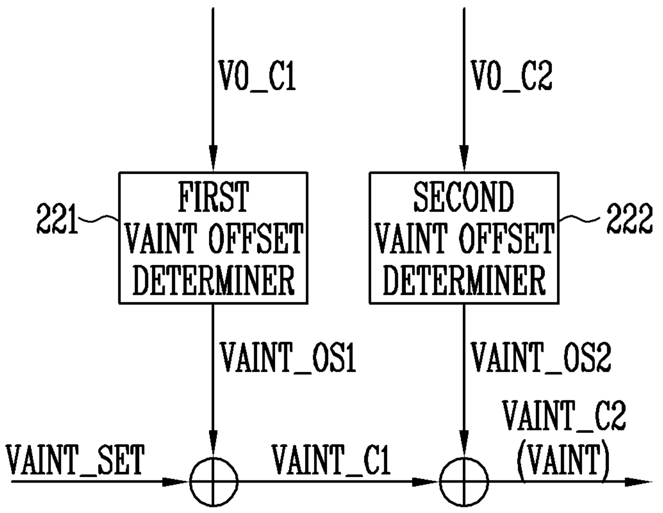
FIG. 24 is a diagram illustrating an example in which the driving controller of the display device of FIG. 23 determines the anode initialization voltage.
Figure 25:
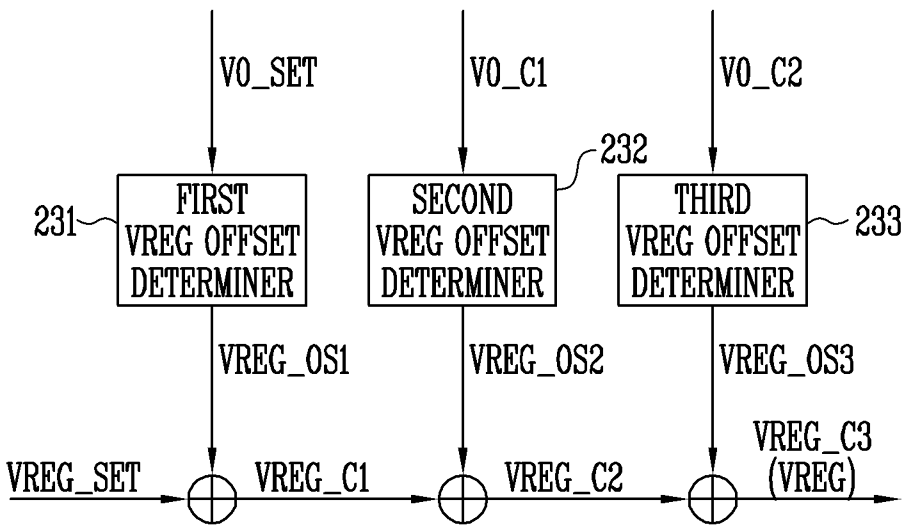
FIG. 25 is a diagram illustrating an example in which the driving controller of the display device of FIG. 23 determines the grayscale expression voltage.
Figure 26:
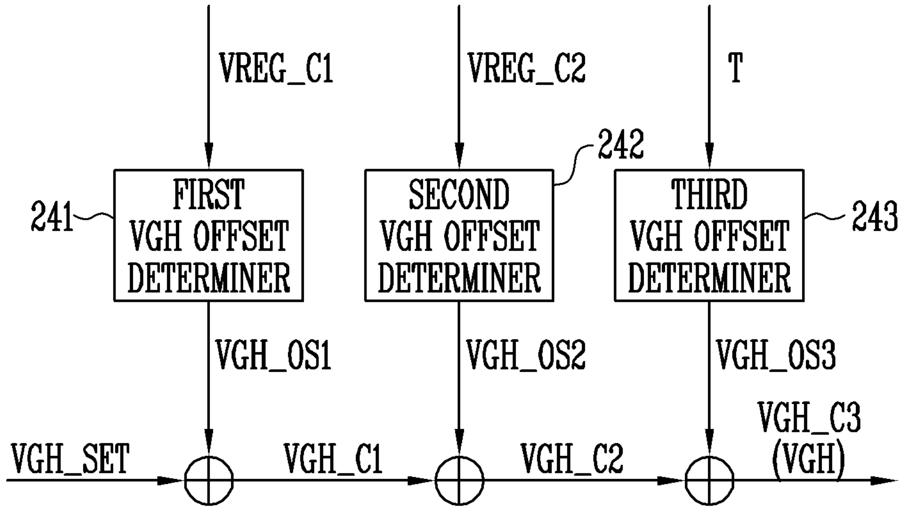
FIG. 26 is a diagram illustrating an example in which the driving controller of the display device of FIG. 23 determines the gate high voltage.
Figure 27:
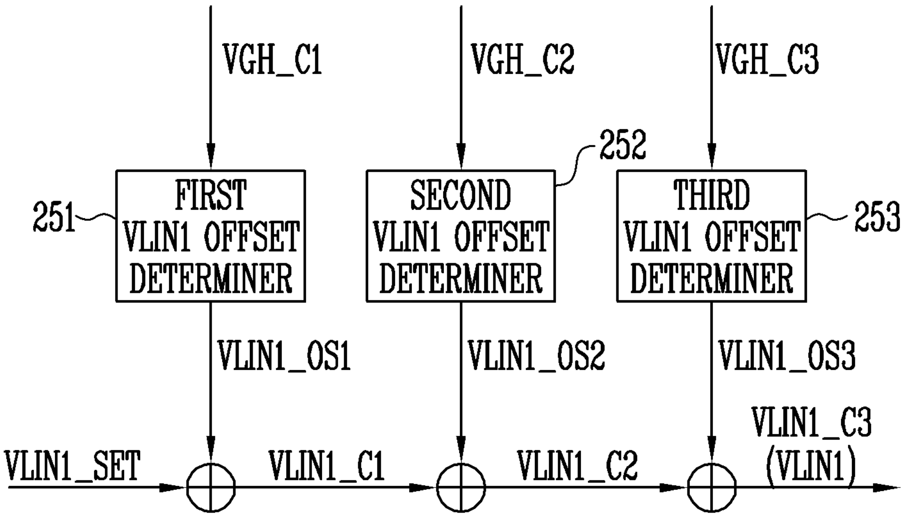
FIG. 27 is a diagram illustrating an example in which the driving controller of the display device of FIG. 23 determines the source voltage.
Figure 28:
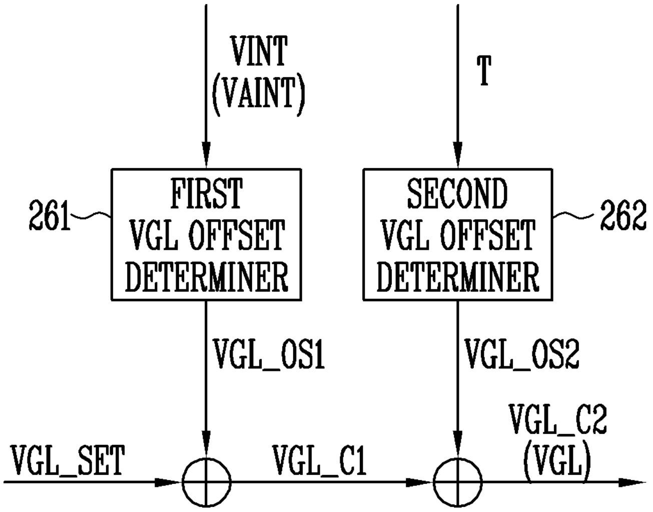
FIG. 28 is a diagram illustrating an example in which the driving controller of the display device of FIG. 23 determines a gate low voltage

FIG. 23 is a diagram illustrating an example in which the driving controller of the display device according to embodiments of the disclosure determines the black data voltage, FIG. 24 is a diagram illustrating an example in which the driving controller of the display device of FIG. 23 determines the anode initialization voltage, FIG. 25 is a diagram illustrating an example in which the driving controller of the display device of FIG. 23 determines the grayscale expression voltage, FIG. 26 is a diagram illustrating an example in which the driving controller of the display device of FIG. 23 determines the gate high voltage, FIG. 27 is a diagram illustrating an example in which the driving controller of the display device of FIG. 23 determines the source voltage, and FIG. 28 is a diagram illustrating an example in which the driving controller of the display device of FIG. 23 determines the gate low voltage.

Since the display device according to the embodiments shown in FIGS. 20) 23 to 28 is substantially the same as the embodiments of the display device of FIG. 1 except that a plurality of offset voltages is used, the same reference numerals and reference symbols are used for identical or similar components, and any repetitive detailed description thereof will be omitted.

Referring to FIGS. 1 and 23, an embodiment the driving controller 200 may include a first black data voltage offset determiner 211 and a second black data voltage offset determiner 212.

The first black data voltage offset determiner 211 may determine a first offset voltage V0_OS1 of the black data voltage V0 based on the driving frequency FR and the dimming level ML. In an embodiment, for example, the first offset voltage V0_OS1 of the black data voltage V0 may have the same form as the offset voltage of the black data voltage V0 of FIG. 9 or 10.

The second black data voltage offset determiner 212 may determine a second offset voltage V0_OS2 of the black data voltage V0 based on the temperature T and the dimming level ML. In an embodiment, for example, the second offset voltage V0_OS2 of the black data voltage V0 may have the same form as the offset voltage of the black data voltage V0 of FIG. 13 or 14.

The driving controller 200 may calculate a first correction black data voltage V0_C1 by adding the first offset voltage V0_OS1 of the black data voltage V0 to the black data set voltage V0_SET, calculate a second correction black data voltage V0_C2 by adding the second offset voltage V0_OS2 of the black data voltage V0 to the first correction black data voltage V0_C1, and determine the second correction black data voltage V0_C2 as the black data voltage V0.

In an embodiment, the second offset voltage V0_OS2 of the black data voltage V0 may be determined based on the gate high voltage and the gate low voltage. As the temperature T increases, the gate high voltage may increase and the gate low voltage may decrease. In addition, the source voltage may be increased to increase the gate high voltage and decrease the gate low voltage. As the source voltage increases, a margin for increasing the grayscale expression voltage and the black data voltage V0 may be secured. The driving controller 200 may increase the black data voltage V0 by applying the second offset voltage V0_OS2 of the black data voltage V0 corresponding to the margin.

Referring to FIGS. 1 and 24, an embodiment of the driving controller 200 may include a first anode initialization voltage offset determiner 221 and a second anode initialization voltage offset determiner 222.

The first anode initialization voltage offset determiner 221 may determine a first offset voltage VAINT_OS1 of the anode initialization voltage VAINT based on the first correction black data voltage V0_C1. In an embodiment, for example, the first offset voltage VAINT_OS1 of the anode initialization voltage VAINT may have the same form as the offset voltage of the anode initialization voltage VAINT of FIG. 11 or 12.

The second anode initialization voltage offset determiner 222 may determine a second offset voltage VAINT_OS2 of the anode initialization voltage VAINT based on the second correction black data voltage V0_C2. In an embodiment, for example, the second offset voltage VAINT_OS2 of the anode initialization voltage VAINT may have the same form as the offset voltage of the anode initialization voltage VAINT of FIG. 15 or 16.

The driving controller 200 may calculate a first correction anode initialization voltage VAINT_C1 by adding the first offset voltage VAINT_OS1 of the anode initialization voltage VAINT to the anode initialization set voltage VAINT_SET, calculate a second correction anode initialization voltage VAINT_C2 by adding the second offset voltage VAINT_OS2 of the anode initialization voltage VAINT to the first correction anode initialization voltage VAINT_C1, and determine the second correction anode initialization voltage VAINT_C2 as the anode initialization voltage VAINT.

As described above, an embodiment of the driving controller 200 may reflect a change in the black data voltage V0 due to an application of the offset voltage to the anode initialization voltage VAINT. For example, when only the first offset voltage is applied to the black data voltage V0, the first correction anode initialization voltage VAINT_C1 may be determined as the anode initialization voltage VAINT.

Referring to FIGS. 1 and 25, an embodiment of the driving controller 200 may include a first grayscale expression voltage offset determiner 231, a second grayscale expression voltage offset determiner 232, and a third grayscale expression voltage offset determiner 233.

The first grayscale expression voltage offset determiner 231 may determine a first offset voltage VREG_OS1 of the grayscale expression voltage VREG based on the black data set voltage V0_SET. The second grayscale expression voltage offset determiner 232 may determine a second offset voltage VREG_OS2 of the grayscale expression voltage VREG based on the first correction black data voltage V0_C1. The third grayscale expression voltage offset determiner 233 may determine a third offset voltage VREG_OS3 of the grayscale expression voltage VREG based on the second correction black data voltage V0_C2.

The driving controller 200 may calculate a first correction grayscale expression voltage VREG_C1 by adding the first offset voltage VREG_OS1 of the grayscale expression voltage VREG_SET to the grayscale expression set voltage VREG_SET, calculate a second correction grayscale expression voltage VREG_C2 by adding the second offset voltage VREG_OS2 of the grayscale expression voltage VREG to the first correction grayscale expression voltage VREG_C1, and determine the second correction grayscale expression voltage VREG_C2 as the grayscale expression voltage VREG.

As described above, an embodiment of the driving controller 200 may reflect the change in the black data voltage V0 due to the application of the offset voltage to the grayscale expression voltage VREG. For example, when only the first offset voltage is applied to the black data voltage V0, the second correction grayscale expression voltage VREG_C2 may be determined as the grayscale expression voltage VREG.

Referring to FIGS. 1 and 26, an embodiment of the driving controller 200 may include a first gate high voltage offset determiner 241, a second gate high voltage offset determiner 242, and a third gate high voltage offset determiner 243.

The first gate high voltage offset determiner 241 may determine a first offset voltage VGH_OS1 of the gate high voltage VGH based on the first correction grayscale expression voltage VREG_C1. The second gate high voltage offset determiner 242 may determine a second offset voltage VGH_OS2 of the gate high voltage VGH based on the second correction grayscale expression voltage VREG_C2. The third gate high voltage offset determiner 243 may determine a third offset voltage VGH_OS3 of the gate high voltage VGH based on the temperature T.

The driving controller 200 may calculate a first correction gate high voltage VGH_C1 by adding the first offset voltage VGH_OS1 of the gate high voltage VGH to the gate high set voltage VGH_SET, calculate a second correction gate high voltage VGH_C2 by adding the second offset voltage VGH_OS2 of the gate high voltage VGH to the first correction gate high voltage VGH_C1, calculate a third correction gate high voltage VGH_C3 by adding the third offset voltage VGH_OS3 of the gate high voltage VGH to the second correction gate high voltage VGH_C2, and determine the third correction gate high voltage VGH_C3 as the gate high voltage VGH.

Due to the characteristic of the switching transistor, the current amount leaked at a high temperature may increase. In addition, as the gate high voltage VGH increases, a current leaked through the switching transistor may decrease. Accordingly, the driving controller 200 may increase the gate high voltage VGH by applying the third offset voltage VGH_OS3 of the gate high voltage VGH based on the temperature T.

In an embodiment, the third offset voltage VGH_OS3 of the gate high voltage VGH may increase as the temperature T increases. In an embodiment, the third offset voltage VGH_OS3 of the gate high voltage VGH may be applied when the temperature T is greater than or equal to a preset reference temperature.

As described above, an embodiment of the driving controller 200 may reflect a change in the grayscale expression voltage VREG due to the application of the offset voltage (that is, the change in the black data voltage V0 according to the application of the offset voltage) and a change in the characteristic of the switching transistor due to the temperature T to the gate high voltage VGH. For example, when only the first offset voltage is applied to the grayscale expression voltage VREG, the first correction gate high voltage VGH_C1 may be determined as the gate high voltage VGH.

However, the disclosure is not limited to an order of applying the offset voltage. For example, when only the first offset voltage is applied to the grayscale expression voltage VREG, a voltage obtained by adding the third offset voltage VGH_OS3 of the gate high voltage VGH to the first correction gate high voltage VGH_C1 may be determined as the gate high voltage VGH.

Referring to FIGS. 1 and 27, an embodiment of the driving controller 200 may include a first source voltage offset determiner 251, a second source voltage offset determiner 252, and a third source voltage offset determiner 253.

The first source voltage offset determiner 251 may determine a first offset voltage VLIN1_OS1 of the source voltage VLIN1 based on the first correction gate high voltage VGH_C1. The second source voltage offset determiner 252 may determine a second offset voltage VLIN1_OS2 of the source voltage VLIN1 based on the second correction gate high voltage VGH_C2. The third source voltage offset determiner 253 may determine a third offset voltage VLIN1_OS3 of the source voltage VLIN1 based on the third correction gate high voltage VGH_C3.

The driving controller 200 may calculate a first correction source voltage VLIN1_C1 by adding the first offset voltage VLIN1_OS1 of the source voltage VLIN1 to the source voltage set voltage VLIN1_SET, calculate a second correction source voltage VLIN1_C2 by adding the second offset voltage VLIN1_OS2 of the source voltage VLIN1 to the first correction source voltage VLIN1_C1, calculate a third correction source voltage VLIN1_C3 by adding the third offset voltage VLIN1_OS3 of the source voltage VLIN1 to the second correction source voltage VLIN1_C2, and determine the third correction source voltage VLIN1_C3 as the source voltage VLIN1.

As described above, an embodiment of the driving controller 200 may reflect a change in the gate high voltage VGH (that is, the change in the black data voltage V0) according to the application of the offset voltage to the source voltage VLIN1. For example, when only the first offset voltage is applied to the gate high voltage VGH, the first correction source voltage VLIN1_C1 may be determined as the source voltage VLIN1.

In an embodiment, the third source voltage offset determiner 253 may determine the third offset voltage VLIN1_OS3 of the source voltage VLIN1 based on the third correction gate high voltage VGH_C3 and the third correction gate low voltage described later. In an embodiment, the driving controller 200 may decrease the reference voltage that is a base of the gate low voltage and increase the source voltage VLIN1 that is a base of the reference voltage, to decrease the gate low voltage based on the temperature T. That is, the driving controller 200 may reflect the change in the gate high voltage VGH (that is, the change in the black data voltage V0) and a change in the gate low voltage to the source voltage VLIN1 due to the application of the offset voltage.

Referring to FIGS. 1 and 28, an embodiment of the driving controller 200 may determine an offset voltage of the gate low voltage VGL based on the initialization voltages VINT and VAINT of the sub-pixel SP.

In an embodiment, the driving controller 200 may determine the offset voltage of the gate low voltage VGL based on the gate initialization voltage VINT. In an embodiment, the driving controller 200 may determine the offset voltage of the gate low voltage VGL based on the anode initialization voltage VAINT.

An embodiment of the driving controller 200 may include a first gate low voltage offset determiner 261 and a second gate low voltage offset determiner 262.

The first gate low voltage offset determiner 261 may determine a first offset voltage VGL_OS1 of the gate low voltage VGL based on the initialization voltages VINT and VAINT. The second gate low voltage offset determiner 262 may determine a second offset voltage VGL_OS2 of the gate low voltage VGL based on the temperature T.

The driving controller 200 may calculate a first correction gate low voltage VGL_C1 by adding the first offset voltage VGL_OS1 of the gate low voltage VGL to a gate low set voltage VGL_SET, calculate a second correction gate low voltage VGL_C2 by adding the second offset voltage VGL_OS2 of the gate low voltage VGL to VGL_C1 to the first correction gate low voltage, and determine the second correction gate low voltage VGL_C2 as the gate low voltage VGL.

In an embodiment, the first gate low voltage offset determiner 261 may determine the first offset voltage VGL_OS1 of the gate low voltage VGL based on the gate initialization voltage VINT. In addition, the first offset voltage VGL_OS1 of the gate low voltage VGL may increase as the gate initialization voltage VINT increases.

In an embodiment, the first gate low voltage offset determiner 261 may determine the first offset voltage VGL_OS1 of the gate low voltage VGL based on the anode initialization voltage VAINT. In addition, the first offset voltage VGL_OS1 of the gate low voltage VGL may increase as the anode initialization voltage VAINT increases.

In an embodiment, the second offset voltage VGL_OS2 of the gate low voltage VGL may have a negative value and may decrease as the temperature T increases. That is, the gate low voltage VGL may decrease as the temperature T increases.

Figure 29:
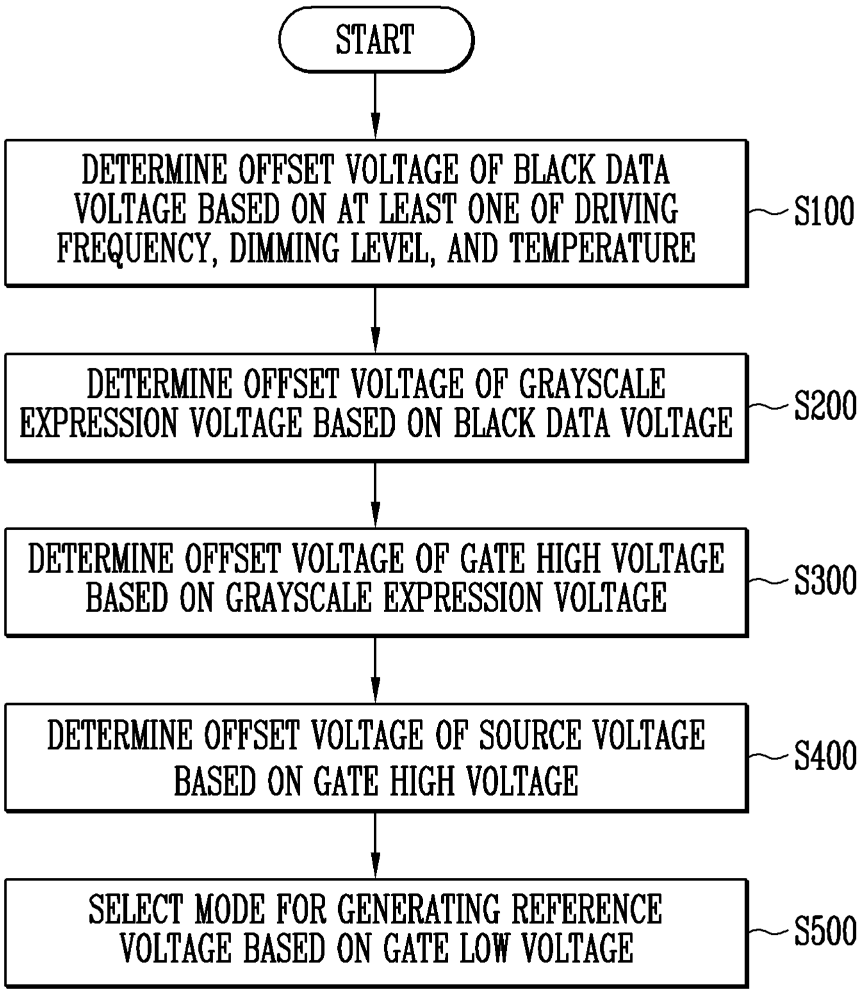
FIG. 29 is a flowchart illustrating a method of driving a display device according to embodiments of the disclosure.

FIG. 29 is a flowchart illustrating a method of driving a display device according to embodiments of the disclosure.

Referring to FIG. 29, an embodiment of the method of driving the display device of FIG. 29 may include determining the offset voltage of the black data voltage based on at least one selected from the driving frequency, the dimming level, and the temperature (S100), determining the offset voltage of the grayscale expression voltage based on the black data voltage (S200), determining the offset voltage of the gate high voltage based on the grayscale expression voltage (S300), determining the offset voltage of the source voltage based on the gate high voltage (S400), and selecting the mode for generating the reference voltage based on the gate low voltage (S500). Processes S100 to S500 according to the method of driving the display device of FIG. 29 may be implemented through (or performed by) the display device of FIG. 1.

Figure 30:
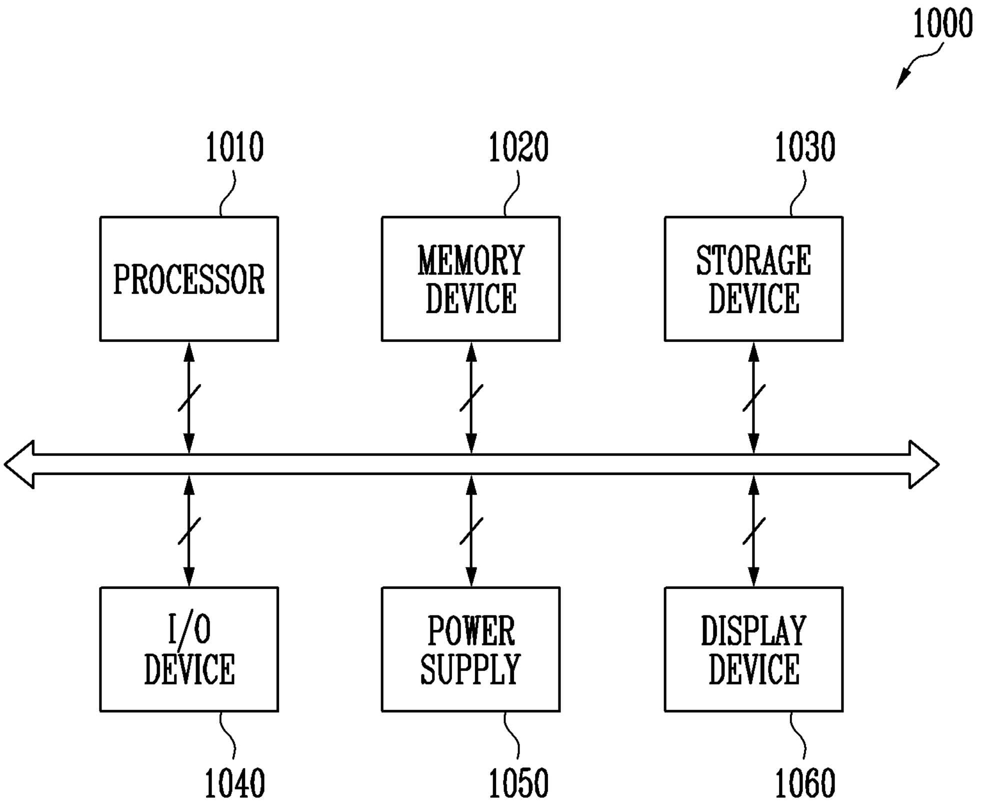
FIG. 30 is a block diagram illustrating an electronic device according to embodiments of the disclosure.

FIG. 30 is a block diagram illustrating an electronic device 1000 according to embodiments of the disclosure.

Referring to FIG. 30, an embodiment of the electronic device 1000 may include a processor 1010, a memory device 1020, a storage device 1030, an input/output device 1040, a power supply 1050, and a display device 1060. At this time, the display device 1060 may be the display device of FIG. 1. In addition, the electronic device 1000 may further include several ports capable of communicating with a video card, a sound card, a memory card, a USB device, or the like, or communicating with other systems. In an embodiment, the electronic device 1000 may be implemented as a smart phone. However, this is merely an example, and the electronic device 1000 is not limited thereto. For example, the electronic device 1000 may be implemented as a mobile phone, a television, a video phone, a smart pad, a smart watch, a tablet personal computer (PC), a vehicle navigation device, a computer monitor, a notebook computer, a head mounted display device, or the like.

The processor 1010 may perform specific calculations or tasks. According to an embodiment, the processor 1010 may be a microprocessor, a central processing unit, an application processor, or the like. The processor 1010 may be connected to other components through an address bus, a control bus, a data bus, or the like. According to an embodiment, the processor 1010 may also be connected to an expansion bus such as a peripheral component interconnect (PCI) bus.

The memory device 1020 may store data to be used for an operation of the electronic device 1000. For example, the memory device 1020 may include a non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM), and a ferroelectric random access memory (FRAM) device, a volatile memory device such as a dynamic random access memory (DRAM) device, a static random access memory (SRAM) device, and a mobile DRAM device, and/or the like.

The storage device 1030 may include a solid state drive (SSD), a hard disk drive (HDD), a CD-ROM, and the like.

The input/output device 1040 may include an input means such as a keyboard, a keypad, a touch pad, a touch screen, and a mouse, and an output means such as a speaker and a printer. According to an embodiment, the display device 1060 may be included in the input/output device 1040.

The power supply 1050 may supply power necessary for an operation of the electronic device 1000. For example, the power supply 1050 may be a power management integrated circuit (PMIC).

The display device 1060 may display an image corresponding to visual information of the electronic device 1000. In an embodiment, the display device 1060 may be an organic light emitting display device or a quantum dot light emitting display device, but is not limited thereto. The display device 1060 may be connected to other components through the buses or other communication links.

The disclosure may be applied to a display device and an electronic device including the display device. For example, the disclosure may be applied to a digital television (TV), a three-dimensional (3D) TV, a mobile phone, a smart phone, a tablet computer, a virtual reality (VR) device, a PC, a home electronic device, a notebook computer, a personal digital assistant (PDA), a portable media player (PMP), a digital camera, a music player, a portable game console, a navigation system, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a sub-pixel;

a gate driver which provides a gate signal to the sub-pixel;

a data driver which provides a data voltage to the sub-pixel;

a driving voltage generator which provides a plurality of gamma reference voltages including a black data voltage to the data driver; and a driving controller which determines an offset voltage of the black data voltage among the plurality of gamma reference voltages based on at least one selected from a driving frequency, a dimming level, and a temperature, wherein the driving controller determines a black data set voltage based on the driving frequency, and determines the black data voltage by adding the offset voltage of the black data voltage to the black data set voltage.

2. The display device according to claim 1, wherein the black data set voltage decreases as the driving frequency increases.

3. The display device according to claim 1, wherein the offset voltage of the black data voltage is less at a second dimming level, which is greater than a first dimming level, than at the first dimming level with respect to a same driving frequency and a same temperature.

4. The display device according to claim 1, wherein the offset voltage of the black data voltage is less at a second driving frequency, which is greater than a first driving frequency, than at the first driving frequency with respect to a same dimming level and a same temperature.

5. The display device according to claim 1, wherein the offset voltage of the black data voltage is less at a second temperature, which is less than a first temperature, than at the first temperature with respect to a same dimming level and a same frequency.

6. The display device according to claim 1, wherein the sub-pixel includes a first color sub-pixel which displays a first color and a second color sub-pixel which displays a second color, and the offset voltage of the black data voltage for the first color sub-pixel is less than the offset voltage of the black data voltage for the second color sub-pixel with respect to a same dimming level, a same driving frequency and a same temperature.

7. The display device according to claim 1, wherein the driving controller determines an offset voltage of an anode initialization voltage for initializing a light emitting element of the sub-pixel based on the black data voltage.

8. The display device according to claim 7, wherein the offset voltage of the anode initialization voltage increases as the offset voltage of the black data voltage increases.

9. The display device according to claim 1, wherein the driving voltage generator includes a first regulator which generates the black data voltage by receiving a grayscale expression voltage, and the driving controller determines an offset voltage of the grayscale expression voltage based on the black data voltage.

10. The display device according to claim 9, wherein the grayscale expression voltage is determined as a sum of the black data voltage and a headroom margin of the first regulator.

11. The display device according to claim 1, wherein the driving voltage generator includes a first regulator which generates the black data voltage by receiving a grayscale expression voltage, the driving voltage generator provides a gate high voltage to the gate driver, and the driving controller determines an offset voltage of the gate high voltage based on the grayscale expression voltage.

12. The display device according to claim 11, wherein the sub-pixel includes a switching transistor, and the gate high voltage is determined as a sum of the grayscale expression voltage and a threshold voltage of the switching transistor.

13. The display device according to claim 1, further comprising:

a power supply which provides a source voltage to the driving voltage generator, wherein the driving voltage generator provides a gate high voltage to the gate driver and includes a second regulator which generates the gate high voltage by receiving the source voltage, and the driving controller determines the source voltage based on the gate high voltage.

14. The display device according to claim 13, wherein the source voltage is determined as a sum of the gate high voltage and a headroom margin of the second regulator.

15. The display device according to claim 1, further comprising:

a power supply which provides a source voltage to the driving voltage generator, wherein the driving voltage generator includes a third regulator which generates a gate low voltage by receiving a reference voltage, and a reference voltage generator which generates the reference voltage based on the source voltage in a first mode and generates the reference voltage based on the source voltage and a first external voltage in a second mode, and the driving controller selects one of the first mode and the second mode based on the gate low voltage.

16. The display device according to claim 15, wherein the reference voltage in the first mode is a voltage corresponding to the source voltage, the reference voltage in the second mode is a voltage corresponding to a sum of the source voltage and the first external voltage, and the driving controller selects the second mode among the first mode and the second mode when a sum of an absolute value of the gate low voltage and a headroom margin of the third regulator is greater than an absolute value of the voltage corresponding to the source voltage.

17. The display device according to claim 1, wherein the driving controller determines a first offset voltage of the black data voltage based on the driving frequency and the dimming level, calculates a first correction black data voltage by adding the first offset voltage of the black data voltage to a black data set voltage, determines a second offset voltage of the black data voltage based on the dimming level and the temperature, calculates a second correction black data voltage by adding the second offset voltage of the black data voltage to the first correction black data voltage, and determines the second correction black data voltage as the black data voltage.

18. The display device according to claim 17, wherein the driving controller determines a first offset voltage of an anode initialization voltage for initializing a light emitting element of the sub-pixel based on the first correction black data voltage, calculates a first correction anode initialization voltage by adding the first offset voltage of the anode initialization voltage to an anode initialization set voltage, determines a second offset voltage of the anode initialization voltage based on the second correction black data voltage, calculates a second correction anode initialization voltage by adding the second offset voltage of the anode initialization voltage to the first correction anode initialization voltage, and determines the second correction anode initialization voltage as the anode initialization voltage.

19. The display device according to claim 17, wherein the driving voltage generator generates the black data voltage by receiving a grayscale expression voltage, and the driving controller determines a first offset voltage of the grayscale expression voltage based on the black data set voltage, calculates a first correction grayscale expression voltage by adding the first offset voltage of the grayscale expression voltage to a grayscale expression set voltage, determines a second offset voltage of the grayscale expression voltage based on the first correction black data voltage, calculates a second correction grayscale expression voltage by adding the second offset voltage of the grayscale expression voltage to the first correction grayscale expression voltage, determines a third offset voltage of the grayscale expression voltage based on the second correction black data voltage, calculates a third correction grayscale expression voltage by adding the third offset voltage of the grayscale expression voltage to the second correction grayscale expression voltage, and determines the third correction grayscale expression voltage as the grayscale expression voltage.

20. The display device according to claim 19, wherein the driving voltage generator provides a gate high voltage to the gate driver, and the driving controller determines a first offset voltage of the gate high voltage based on the first correction grayscale expression voltage, calculates a first correction gate high voltage by adding the first offset voltage of the gate high voltage to a gate high set voltage, determines a second offset voltage of the gate high voltage based on the second correction grayscale expression voltage, calculates a second correction gate high voltage by adding the second offset voltage of the gate high voltage to the first correction gate high voltage, determines a third offset voltage of the gate high voltage based on the temperature, calculates a third correction gate high voltage by adding the third offset voltage of the gate high voltage to the second correction gate high voltage, and determines the third correction gate high voltage as the gate high voltage.

21. The display device according to claim 20, further comprising a power supply which provides a source voltage to the driving voltage generator, wherein the driving voltage generator generates the gate high voltage by receiving the source voltage, and the driving controller determines a first offset voltage of the source voltage based on the first correction gate high voltage, calculates a first correction source voltage by adding the first offset voltage of the source voltage to a source set voltage, determines a second offset voltage of the source voltage based on the second correction gate high voltage, calculates a second correction source voltage by adding the second offset voltage of the source voltage to the first correction source voltage, determines a third offset voltage of the source voltage based on the third correction gate high voltage, calculates a third correction source voltage by adding the third offset voltage of the source voltage to the second correction source voltage, and determines the third correction source voltage as the source voltage.

22. The display device according to claim 1, wherein the driving voltage generator provides a gate low voltage to the gate driver, and the driving controller determines an offset voltage of the gate low voltage based on an initialization voltage of the sub-pixel.

23. The display device according to claim 1, wherein the driving voltage generator provides a gate low voltage to the gate driver, and the driving controller determines a first offset voltage of the gate low voltage based on an initialization voltage of the sub-pixel, calculates a first correction gate low voltage by adding the first offset voltage of the gate low voltage to a gate low set voltage, determines a second offset voltage of the gate low voltage based on the temperature, calculates a second correction gate low voltage by adding the second offset voltage of the gate low voltage to the first correction gate low voltage, and determines the second correction gate low voltage as the gate low voltage.

24. A method of driving a display device, the method comprising:

determining an offset voltage of a black data voltage based on at least one selected from a driving frequency, a dimming level, and a temperature;

determining an offset voltage of a grayscale expression voltage based on the black data voltage;

determining an offset voltage of a gate high voltage based on the grayscale expression voltage;

determining an offset voltage of a source voltage based on the gate high voltage; and selecting a mode for generating a reference voltage based on a gate low voltage.

25. An electronic device comprising:

a processor which provides input image data to a display device;

the display device which displays an image based on the input image data; and a power supply which supplies power to the display device, wherein the display device comprises:

a display panel including a sub-pixel;

a gate driver which provides a gate signal to the sub-pixel;

a data driver which provides a data voltage to the sub-pixel;

a driving voltage generator which provides a plurality of gamma reference voltages including a black data voltage to the data driver; and a driving controller which determines an offset voltage of the black data voltage among the plurality of gamma reference voltages based on at least one selected from a driving frequency, a dimming level, and a temperature, and wherein the driving controller determines a black data set voltage based on the driving frequency, and determines the black data voltage by adding the offset voltage of the black data voltage to the black data set voltage.

* * * * *